(12) United States Patent
Walker et al.

(10) Patent No.: US 6,754,636 B1
(45) Date of Patent: *Jun. 22, 2004

(54) PURCHASING SYSTEMS AND METHODS WHEREIN A BUYER TAKES POSSESSION AT A RETAILER OF A PRODUCT PURCHASED USING A COMMUNICATION NETWORK

(75) Inventors: Jay S. Walker, Ridgefield, CT (US); Andrew S. Van Luchene, Norwalk, CT (US); Magdalena Mik, Greenwich, CT (US); Daniel E. Tedesco, New Canaan, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/337,906

(22) Filed: Jun. 22, 1999

Related U.S. Application Data

(63) Continuation-in-part of application No. 08/889,503, filed on Jul. 8, 1997, and a continuation-in-part of application No. 08/889,319, filed on Jul. 8, 1997, and a continuation-in-part of application No. 09/190,744, filed on Nov. 12, 1998, which is a continuation-in-part of application No. 08/707,660, filed on Sep. 4, 1996, now Pat. No. 5,794,207, and a continuation-in-part of application No. 09/083,345, filed on May 22, 1998.

(51) Int. Cl.[7] .............................................. G06F 17/60
(52) U.S. Cl. ............................ 705/26; 705/27; 705/75; 705/39; 705/20; 705/14
(58) Field of Search ............................ 705/26, 27, 75, 705/39, 20, 14

(56) References Cited

U.S. PATENT DOCUMENTS 3,691,527 A    9/1972  Yamamoto .............. 340/149 A (List continued on next page.)

FOREIGN PATENT DOCUMENTS

| CA | 2070736 A1 | 6/1992 |
| CA | 2217739 A1 | 4/1996 |

(List continued on next page.)

OTHER PUBLICATIONS

Desjardins, Doug, Hollywood's investment in online video retailer gets mixed reviews., Video Store, v20,n23,p1+, Aug. 09, 1998.*

(List continued on next page.)

*Primary Examiner*—Jeffrey A. Smith
*Assistant Examiner*—Mark Fadok
(74) *Attorney, Agent, or Firm*—Magdalena M. Fincham

(57) ABSTRACT

Purchasing systems and methods are provided wherein a buyer takes possession of a product at a retailer. A purchasing system may communicate with a buyer through a communication network to establish a first price for a product between the buyer and a seller. The purchasing system may also arrange for the buyer to take possession of the product at a retailer, different from the seller, that offers the product for sale at a second price. Verification information, which enables the retailer to authorize the buyer to take possession of the product, is transmitted to the retailer. The buyer provides a payment, based on the first price, to the purchasing system in exchange for the right to take possession of the product at the retailer. In one embodiment, the purchasing system receives a buyer offer, including an offer price, related to the product. In another embodiment, the purchasing system transmits redemption information, including a redemption code, to the buyer. The redemption information may also include information that enables the creation of a voucher to be used when taking possession of the product. The purchasing system may also receive information related to an attempt by the buyer to take possession of the product, including the redemption code, from the retailer.

23 Claims, 40 Drawing Sheets

U.S. PATENT DOCUMENTS

| | | | |
|---|---|---|---|
| 4,237,537 A | | 12/1980 | Pitches et al. .............. 364/465 |
| 4,341,951 A | * | 7/1982 | Benton ........................ 235/379 |
| 4,554,446 A | * | 11/1985 | Murphy et al. ............. 235/487 |
| 4,734,858 A | | 3/1988 | Schlafly |
| 4,737,910 A | | 4/1988 | Kimbrow |
| 4,766,548 A | | 8/1988 | Cedrone et al. ............ 364/479 |
| 4,799,156 A | | 1/1989 | Shavit et al. |
| 4,882,675 A | | 11/1989 | Nichtberger et al. |
| 4,947,028 A | | 8/1990 | Gorog ........................ 235/381 |
| 4,992,940 A | | 2/1991 | Dworkin |
| 5,010,485 A | * | 4/1991 | Bigari ........................ 364/408 |
| 5,064,999 A | | 11/1991 | Okamoto et al. ........... 235/379 |
| 5,117,354 A | | 5/1992 | Long et al. |
| 5,191,410 A | | 3/1993 | McCalley et al. |
| 4,947,028 A | | 6/1993 | Gorog ........................ 235/381 |
| 5,253,165 A | | 10/1993 | Leiseca et al. .............. 364/407 |
| 5,256,863 A | * | 10/1993 | Ferguson et al. ........... 235/383 |
| 5,305,195 A | | 4/1994 | Murphy |
| 5,319,542 A | | 6/1994 | King, Jr. et al. |
| 5,367,452 A | | 11/1994 | Gallery et al. .............. 364/401 |
| 5,434,394 A | | 7/1995 | Roach et al. |
| 5,452,344 A | | 9/1995 | Larson ........................ 379/107 |
| 5,495,412 A | | 2/1996 | Thiessen |
| 5,513,117 A | | 4/1996 | Small .......................... 364/479 |
| 5,515,268 A | | 5/1996 | Yoda |
| 5,526,257 A | | 6/1996 | Lerner |
| 5,537,314 A | | 7/1996 | Kanter |
| 5,546,316 A | | 8/1996 | Buckley et al. ........ 364/479.03 |
| 5,550,746 A | | 8/1996 | Jacobs |
| 5,557,721 A | | 9/1996 | Fite et al. |
| 5,590,197 A | | 12/1996 | Chen et al. |
| 5,592,375 A | | 1/1997 | Salmon et al. |
| 5,592,378 A | | 1/1997 | Cameron et al. |
| 5,611,051 A | | 3/1997 | Pirelli |
| 5,612,527 A | * | 3/1997 | Ovadia ........................ 235/383 |
| 5,631,724 A | | 5/1997 | Sawada et al. ............. 355/205 |
| 5,637,859 A | | 6/1997 | Menoud ...................... 235/492 |
| 5,692,132 A | | 11/1997 | Hogan ........................ 395/227 |
| 5,701,252 A | | 12/1997 | Facchin et al. ............. 364/479 |
| 5,708,782 A | | 1/1998 | Larson et al. |
| 5,710,886 A | | 1/1998 | Christensen et al. |
| 5,710,887 A | | 1/1998 | Chelliah et al. |
| 5,713,795 A | | 2/1998 | Kohorn |
| 5,727,163 A | | 3/1998 | Bezos ........................ 395/227 |
| 5,727,164 A | | 3/1998 | Kaye et al. |
| 5,734,150 A | | 3/1998 | Brown et al. ............... 235/381 |
| 5,739,512 A | | 4/1998 | Tognazzini |
| 5,754,653 A | | 5/1998 | Canfield |
| 5,758,328 A | | 5/1998 | Giovannoli |
| 5,761,648 A | | 6/1998 | Golden et al. |
| 5,774,870 A | | 6/1998 | Storey |
| 5,774,874 A | * | 6/1998 | Veeneman et al. ............ 705/27 |
| 5,791,991 A | | 8/1998 | Small |
| 5,794,207 A | | 8/1998 | Walker et al. |
| 5,799,284 A | | 8/1998 | Bourquin |
| 5,806,044 A | | 9/1998 | Powell |
| 5,809,144 A | | 9/1998 | Sirbu et al. ................... 380/25 |
| 5,816,918 A | | 10/1998 | Kelley et al. |
| 5,822,736 A | * | 10/1998 | Hartman et al. ................ 705/1 |
| 5,832,457 A | | 11/1998 | O'Brien et al. |
| 5,842,178 A | | 11/1998 | Giovannoli |
| 5,845,259 A | | 12/1998 | West et al. |
| 5,848,399 A | | 12/1998 | Burke |
| 5,855,007 A | | 12/1998 | Jovicic et al. |
| 5,857,175 A | * | 1/1999 | Day et al. ..................... 705/14 |
| 5,864,604 A | | 1/1999 | Moen et al. |
| 5,870,716 A | | 2/1999 | Sugiyama et al. |
| 5,870,717 A | | 2/1999 | Wiecha |
| 5,870,719 A | | 2/1999 | Maritzen et al. |
| 5,875,110 A | | 2/1999 | Jacobs |
| 5,878,139 A | * | 3/1999 | Rosen ........................... 380/24 |
| 5,878,401 A | | 3/1999 | Joseph |
| 5,883,810 A | | 3/1999 | Franklin et al. |
| 5,887,271 A | | 3/1999 | Powell |
| 5,890,136 A | | 3/1999 | Kipp |
| 5,907,830 A | | 5/1999 | Engel et al. |
| 5,923,016 A | * | 7/1999 | Fredregill et al. .......... 235/380 |
| 5,924,078 A | * | 7/1999 | Naftzger ...................... 705/16 |
| 5,924,080 A | * | 7/1999 | Johnson ....................... 705/26 |
| 5,963,939 A | * | 10/1999 | McCann et al. ................ 707/4 |
| 5,970,469 A | | 10/1999 | Scroggie et al. ............. 705/14 |
| 5,988,346 A | | 11/1999 | Tedesco et al. ............. 194/217 |
| 6,014,634 A | * | 1/2000 | Scoggie ........................ 705/14 |
| 6,035,284 A | * | 3/2000 | Straub et al. ................. 705/28 |
| 6,038,551 A | * | 3/2000 | Barlow et al. ................ 705/41 |
| 6,058,373 A | | 5/2000 | Blinn et al. |
| 6,058,375 A | | 5/2000 | Park ............................ 705/30 |
| 6,061,660 A | * | 5/2000 | Eggeston et al. ............. 705/14 |
| 6,073,840 A | | 6/2000 | Marion ....................... 235/381 |
| 6,085,168 A | * | 7/2000 | Mori et al. .................... 705/17 |
| 6,119,099 A | * | 9/2000 | Walker et al. ................ 705/16 |
| 6,131,085 A | | 10/2000 | Rossides |
| 6,167,382 A | | 12/2000 | Sparks et al. |
| 6,192,349 B1 | * | 2/2001 | Husemann .................... 705/65 |
| 6,193,154 B1 | | 2/2001 | Phillips et al. .............. 235/381 |
| 6,193,155 B1 | * | 2/2001 | Walker et al. .............. 235/381 |
| 6,199,014 B1 | | 3/2001 | Walker et al. |
| 6,205,435 B1 | * | 3/2001 | Biffar ........................... 705/41 |
| 6,236,971 B1 | * | 5/2001 | Stefik et al. .................... 705/1 |
| 6,247,047 B1 | | 6/2001 | Wolff et al. |
| 6,249,772 B1 | * | 6/2001 | Walker et al. ................ 705/26 |
| 6,260,024 B1 | * | 7/2001 | Shkedy ........................ 705/37 |
| 6,266,651 B1 | * | 7/2001 | Woolston ..................... 705/27 |
| 6,330,544 B1 | * | 12/2001 | Walker et al. ................ 705/14 |
| 6,370,513 B1 | * | 4/2002 | Kolawa et al. ............... 705/10 |
| 6,512,570 B2 | | 1/2003 | Garfinkle et al. |

FOREIGN PATENT DOCUMENTS

| | | |
|---|---|---|
| EP | 0 779 587 A2 A3 | 9/1996 |
| EP | 0 817 138 A1 | 1/1998 |
| JP | 08137951 | 5/1996 |
| JP | 11088560 A | 9/1997 |
| JP | 10187820 | 7/1998 |
| JP | 10214284 | 8/1998 |
| JP | 10240830 | 9/1998 |
| JP | 10269049 | 10/1998 |
| WO | WO 97/16797 | 5/1997 |
| WO | WO 97/16897 | 5/1997 |
| WO | WO 97/21200 | 6/1997 |
| WO | WO 97/23838 | 7/1997 |
| WO | WO 9735441 | 9/1997 |
| WO | WO 97/44749 | 11/1997 |
| WO | WO 98/06050 | 2/1998 |
| WO | WO 98/15907 | 4/1998 |
| WO | WO 98/19260 | 5/1998 |
| WO | WO 98/21713 | 5/1998 |
| WO | WO 98/48388 | 10/1998 |
| WO | WO 98/48563 | 10/1998 |
| WO | WO 98/49658 | 11/1998 |
| WO | WO 99/04326 | 1/1999 |
| WO | WO 99/07121 | 2/1999 |
| WO | WO 99/09508 | 2/1999 |

OTHER PUBLICATIONS

Shea, Barbara, "Read Fine Print When Comparing Car Rentals", Feb. 9, 1997, St. Louis Post–Dispatch, Section: Travel & Leisure, pg. 04T.

Quinn, Jane Bryant, "New Cars for Less", Newsweek; Oct. 23, 1978; Section: The Columnists; at pg. 80.

Hilts, Paul, "Technology meets commerce; electronic publishing: includes articles on the World Wide Web and the annual Military Book Show; ABA '96", Publishers Weekly, Section: vol. 243; No. 28; Pg. 43; ISSN: 0000–0019; Jul. 8, 1996.

"About CyberSlice", (http://www.cyberslice.com/cgi–bin/WebObjects/CyberSlice:2@httpserv01/), download date: May 6, 1997.

"My Auto Broker—Online Auto Broker", (http://www.adverlink.com/myautobroker/), download date: May 28, 1997.

"PriceWatch", (http://icon.co.za/–robo/prod01.htm), download date: Jun. 9, 1997.

"Reaching out in new directions—introducing U$A Value Exchange", First Data Corp. Merchant Services, Brochure.

PCT International Search Report for Application No. PCT/US 97/13588, dated Dec. 4, 1997.

Anthony Joseph, "Baby the engine, and other saving tips", The Christian Science Monitor, Nov. 4, 1986; Section: Autos'87 Pullout; Pg. B10.

"Six vendors sign on for early electronic commerce venture", Phillips Business Information, Inc. Voice Technology News, Dec. 13, 1994; No. 25, vol. 6; ISSN: 1045–1498.

"Coupons & more", welcome to coolsavings.com—Copyright 1996–1999. (http://208.134.230.42/cgi–win/temp-prs.exe/first.htm).

Judith Evans, "Who was that Masked Cybershopper?; MasterCard–Visa Agreement on Credit Card Security May Make On–Line Commerce Fly", The Washington Post, View Related Topics; Feb. 2, 1996, Final Edition; Section: Financial; Pg. F01.

"First Virtual Holdings Releases Beta Software for Secure Transactions on Microsoft Merchant Server", PR Newswire, Mar. 31, 1997; Section: Finacial News.

"The easy, pain–free way to buy or lease your next car", What is autoseek; (http://www.autoseek.com/#what) download date: May 28, 1997.

Nora Lockwood Tooher, "Macy's new gift card gets trial run in Warwick", The Providence Journal–Bulletin; Oct. 1, 1998; Section: Business, Pg. 1E.

Denise Caruso, "Digital Commerce: The boom in on–line shopping adds a twist to the old quandary of how to tax interstate purchases", The New York Times, View Related Topics, Dec. 28, 1998; Late Edition—Final; Section: C; Pg. 3; Column 5; Business/Financial Desk.

James Fallon, "Safeway puts ordering into Customers's palms", Executive Technology, Jan. 1999.

"A personal shopping organizer for the web savvy consumer. My KillerApp offers a personalized shopping experience to meet the unique needs of every individual user". (http://www.killerapp.com/html/main/pr0004.html)

"SaveSmart—How saveSmart Works for Consumers"; (http:/www.savesmart.com/consumer–howitworks.html), download date: Jan. 17, 1999.

"WebVoucher", (www.pinex.co.uk/webvoucher/), download date: Mar. 14, 1999.

"Welcome to Planet U, providers of U–pons—Internet Coupons"; (http:/www.planetu.com/), download date: Mar. 16, 1999.

"Webcerificate, the perfect gift–giving solution . . . It's quick! It's Easy! It's Secure!"; (http:/www.webcertificate-.com:443/webcert/faq–detail.asp), download date: May 20, 1999.

"Kmart expands inventory via in–store kiosks", Jun. 20, 1999, RT/News; (www.retailtech.com).

David Lazarus, "E–Commerce, Japanese style", Wired online page, Jun. 7, 1999.

"Mercata—Group Buying Power"; (http:/www.mercata-.com/cgi–bin/mercata/mercata/v1/pages/home.jsp), download date: Jun. 7, 1999.

"Wal–mart vs. Amazon: The fight begins", Yahoo News, Jun. 9, 1999.

"Circuit City to Integrate E–Commerce with store shopping; retailer's E–superstore–www.circuitcity.com– to open in Jul.", PR Newswire, Jun. 15, 1999; Section: Financial News.

James Frederick, "Walgreens gears for opening of is own Internet pharmacy", Drug Store News, Chain Pharmacy, A Lebhar–Friedman Publication, Jul. 19, 1999.

Shop the Marketplace, 1–800–flowers.com; (http:/www.1800flowers.com/flowers/welcome.asp), download date: Aug. 3, 1999.

"The Leader in Internet Shopping Systems for Supermarkets and Drug Stores", groceries online. Copyright 1996 Groceries Online, Inc. (http:/www.groceries–online.com/), download date: Aug. 3, 1999.

"Internet Wine Gift Company Offers Answer to Recent Legislation", Yahoo!. Finance, *PRNewswire*, Company Press Release; Aug. 11, 1999.

"Brother Industries is pushing ahead with its new PC software . . .", IDC Japan Report, Aug. 30, 1991, Section: vol. 17, pg. 53.

Maras, Elliot, "1995: downsizing adds costs; new strategies sought", Automatic Merchandiser, Aug. 1996, pp. 20–22, 24, 26, 28, 30, 32, 34, 36, 38, 40 and 44.

Naik, Gautam, "In Digital Dorm, Click on Return for Soda", The Wall Street Journal, Jan. 23, 1997, Section: Online, pg. B1.

Website: "CSH Drink Machine(s)", (http:/www csh rit edu/proj/drink html), download date: Jan. 29, 1998.

Website: "FAQ: CSH Coke Machine Information", (http//www cs uu nl/wais/html/na–dir/csh–coke–machine–info html), download date: Oct. 24, 2000.

"United Buying Service"; http://www inform u md edu/muc/clubinfo/ubs html; download date: Apr. 15, 2003.

PCT International Search Report for Application No. PCT/US 97/13588, dated Dec. 4, 1997.

Anthony Joseph, "Baby the engine, and other saving tips", The Christian Science Monitor, Nov. 4, 1986; Section: Autos '87 Pullout; Pg. B10.

PCT International Application No. WO 97/35441 entitled "Incentive Based Information Generation System" published to M.W. Walden on Sep. 25, 1997.

PCT International Application No. WO 98/06050 entitled "System and Method for a Targeted Payment System Discount Program" published to R. L. Peirce et al. on Feb. 12, 1998.

PCT International Application No. WO 98/15907 entitled "Method and Device for Constructing a Database Containing customer Data and/or Organizing a Discount or Coupon System" published to Martin Finsterwald on Apr. 16, 1998.

* cited by examiner

600

| CATEGORY CODE 610 | CATEGORY DESCRIPTION 620 |
|---|---|
| TV | TELEVISION |
| VC | VIDEO CAMERA |
| SC | STILL PHOTO CAMERA |
| PC | PERSONAL COMPUTER |
| DW | DISHWASHER |
| WM | WASHING MACHINE |
| ST | STEREO; HOME |
| ST-C | STEREO; CAR |
| LM | LAWN MOWER |

FIG. 6

| PRODUCT CATEGORY 710 | CLASS 1 720 | CLASS 2 730 | CLASS 3 740 |
|---|---|---|---|
| TV | SONI TOHIBA | MAGNETBOX PANATRONIC | PCA SAMSONG |
| SC | NIFON RINALTO | CODAK KINNIR | LINOX |
| PC | BELL PEAR | COMPACT GATELOCK | PICKARD ROLL |
| WM | PAYTAG WHIRLBATH | CE CLEANBOY | - |

| PRODUCT IDENTIFIER 911 | PRODUCT CATEGORY 912 | PRODUCT CLASS 913 | PRODUCT FEATURES 914 | SELLER IDENTIFIER 915 | MINIMUM PRICE 916 | RETAILER IDENTIFIER 917 |
|---|---|---|---|---|---|---|
| P102-39 | TV | 1 | URM; SS; PIP | S 12345 | $500.00 | N/A |
| P102-39 | TV | 1 | URM; SS; PIP | S 23456 | $490.00 | R031-29<br>R192-05<br>R718-93 |
| P310-99 | SC | 2 | PC; PV; DS | S 34567 | $300.00 | R192-05<br>R302-11 |
| P003-11 | SC | 2 | PV; MM-1 | S 45678 | $200.00 | R031-29<br>R192-05<br>R302-11 |

| PRODUCT IDENTIFIER 921 | PRODUCT DESCRIPTION 922 | PRODUCT CLASS 923 | PRODUCT CATEGORY 924 | SELLER IDENTIFIER 925 | MINIMUM PRICE 926 | AVAILABLE QUANTITY 927 | REGION 928 | RETAILER IDENTIFIER 929 |
|---|---|---|---|---|---|---|---|---|
| P102-39 | 27" TELEVISION; SONI; BLACK; MODEL ST-942 | 1 | TV | S 23456 | $500.00 | 20 | CT; MA | R 031-29 R 781-96 R 005-11 |
| P310-99 | DIGITAL CAMERA; GREY; PANORAMIC; COMES W/ BLACK LEATHER CASE; MODEL LN-198 | 2 | SC | S 34567 | $490.00 | 300 | NEW ENGLAND | R 031-29 R 088-99 |
| P098-13 | WHIRLBATH WASHER; OFF WHITE; MODEL WS-302 | 1 | WM | S 03218 | $300.00 | 50 | FL | R 999-11 R 888-22 R 666-33 |
| P909-11 | CLEANBOY | 2 | WM | S 13029 | $600.00 | 20 | USA | R 102-22 R 701-99 R 902-03 |

| PRODUCT IDENTIFIER 931 | PRODUCT DESCRIPTION 932 | PRODUCT CATEGORY 933 | PRODUCT FEATURES 934 | MINIMUM PRICE 935 |
|---|---|---|---|---|
| P099-32 | 27" TELEVISION; MODEL AK-0497 | TV | RM; PIP; SS | $500.00 |
| P098-13 | 36" TELEVISION; MODEL 5R-0312 | TV | URM; PIP; SS | $650.00 |
| P072-99 | 27" TELEVISION; MODEL AK-0473 | TV | RM | $400.00 |
| P032-86 | 21" TELEVISION; MODEL PI-0372 | TV | -- | $200.00 |
| P045-03 | 45" TELEVISION; MODEL OR-9132 | TV | URM; SS | $600.00 |

| PRODUCT IDENTIFIER 941 | PRODUCT CATEGORY 942 | PRODUCT CLASS 943 | PRODUCT FEATURES 944 | SELLER IDENTIFIER 945 | MAXIMUM SUBSIDY AMOUNT 946 | RETAILER IDENTIFIER 947 |
|---|---|---|---|---|---|---|
| P102-39 | TV | 1 | URM; SS; PIP | S 12345 | $50.00 | N/A |
| P102-39 | TV | 1 | URM; SS; PIP | S 23456 | $20.00 | R031-29<br>R192-05<br>R718-93 |
| P310-99 | SC | 2 | PC; PV; DS | S 34567 | $30.00 | R192-05<br>R302-11 |
| P003-11 | SC | 2 | PV; MM-1 | S 45678 | $100.00 | R031-29<br>R192-05<br>R302-11 |

| SELLER IDENTIFIER 1010 | SELLER NAME 1020 | SELLER TYPE 1030 | SELLER ADDRESS 1040 | SELLER CATEGORIES 1050 |
|---|---|---|---|---|
| S 12345 | WALMAK | RETAILER | E-MAIL | TV, SC, PC |
| S 23456 | SONI | MANUFACTURER | HTTP | TV, ST |
| S 34567 | PANATRONIC | MANUFACTURER | CITY+STATE | TV |
| S 45678 | AIWER | MANUFACTURER | FILEPATH | TV, ST-C |
| S 56789 | WALMAK STORE # 892 | RETAILER | E-MAIL | TV, SC, PC |
| S 67890 | TOHIBA | MANUFACTURER | E-MAIL | ST, ST-C |

| RETAILER IDENTIFIER 1110 | RETAILER NAME 1120 | RETAILER LOCATION 1130 | PRODUCT CATEGORIES HONORED / SOLD 1140 |
|---|---|---|---|
| R031-29 | WALMAK STORE # 1920 | 10 S. NEW ST. NEW TOWN, CT 55555 | TV; VC; SC; ST; ST-C |
| R192-05 | SIRCUIT CITY STORE #8132 | 2930 HIGH BLVD. TOWN, MA 44444 | TV; VC; SC; PC; ST; ST-C |
| R302-11 | JOE'S ELECTRONICS | 89 COUNTRY LN. PORT SHIP, NY 33333 | VC; SC; ST |
| R718-93 | WALMAK STORE # 2311 | 357 LONG HWY. CITY, VT 22222 | TV; VC; SC; ST; ST-C |
| R012-39 | SEERS STORE # 2813 | 1829 WIDE RD. METROPOLIS, CA 99999 | DW; PC; ST; ST-C; LM |

| OFFER IDENTIFIER 1211 | BUYER E-MAIL 1212 | OFFER PRICE 1213 | SELECTED PRODUCT CATEGORY 1214 | SELECTED PRODUCT CLASS 1215 | SELECTED PRODUCT FEATURES 1216 | OFFER STATUS 1217 |
|---|---|---|---|---|---|---|
| O-932-122-08 | BUCK@ AOL.COM | $200.00 | TV | 3 | RM | REJECTED |
| O-192-032-25 | JENNY@ ATT.COM | $500.00 | WM | 2 | TL; EX | ACCEPTED |
| O-898-323-01 | BIFF@ SURFREE.COM | $400.00 | SC | 1 | PV; MM-1; DG; PC | ACCEPTED |
| O-111-098-33 | ARI@ CBC.COM | $320.00 | TV | 2 | URM; PIP; SS | PENDING |

| SECONDARY OFFER MADE? 1221 | SECONDARY OFFER PRICE 1222 | SECONDARY OFFER STATUS 1223 | PAYMENT IDENTIFIER 1224 |
|---|---|---|---|
| YES | $210.00 | ACCEPTED | 2222-3333-4444-5555 |
| NO | N/A | N/A | 3333-4444-5555-6666 |
| NO | N/A | N/A | 4444-555-6666-7777 |
| NO | N/A | N/A | 5555-6666-7777-8888 |

| SUPPLEMENTAL OFFER IDENTIFIER 1310 | SUPPLEMENTAL OFFER DESCRIPTION 1320 | RETAILER IDENTIFIER 1330 |
|---|---|---|
| 00-32 | FREE MOVIE TAPE | R031-29 |
| 09-83 | 50% OFF ANY CD IN STORE | R139-08 |
| 19-05 | $15.00 OFF LIFETIME WARANTEE | R022-91 |
| 33-11 | 30% OFF TRIPOD MODEL LL-122 | R111-77 |
| 55-44 | 3 FREE ROLLS OF FILM | R919-55 |

| | |
|---|---|
| TRANSACTION IDENTIFIER: | T103-222-99 |
| OFFER IDENTIFIER: | O-932-112-08 |
| REDEMPTION CODE: | 1876-3290-0187 |
| PAYMENT IDENTIFIER: | 2222-3333-4444-5555 |
| INITIAL PAYMENT AMOUNT: | $230.00 |
| FINAL PAYMENT AMOUNT: | $213.00 |
| PAYMENT STATUS: | CHARGED |
| SELLER IDENTIFIER: | S 03298 |
| PRODUCT IDENTIFIER | P 107-77 |

| RETAILER IDENTIFIER 1420 | REDEMPTION STATUS 1430 | SUPPLEMENTAL OFFER IDENTIFIER 1440 | SUPPLEMENTAL OFFER STATUS 1450 |
|---|---|---|---|
| R031-29 | REDEEMED | 00-32 | REDEEMED |
| R193-08 | INVALID | 09-83 | INVALID |
| R022-91 | INVALID | 19-05 | INVALID |

FIG. 14

| PRODUCT IDENTIFIER 1510 | RETAILER IDENTIFIER 1520 | SETTLEMENT PRICE 1530 | RETAILER IDENTIFIER 1522 | SETTLEMENT PRICE 1532 | RETAILER IDENTIFIER 1524 | SETTLEMENT PRICE 1534 |
|---|---|---|---|---|---|---|
| P 033-99 | R005-99 | $199.00 | R009-55 | $200.00 | R722-77 | $200.00 |
| P 111-00 | R077-11 | $50.00 | R028-28 | $50.00 | R917-22 | $50.00 |
| P 003-12 | R028-17 | $215.00 | R339-02 | $220.00 | R081-91 | $218.00 |
| P 983-66 | R710-55 | $600.00 | R888-34 | $605.00 | R102-39 | $600.00 |

| PRODUCT IDENTIFIER 1610 | PRODUCT CATEGORY 1620 | PRODUCT FEATURES 1630 | MINIMUM PRICE 1640 |
|---|---|---|---|
| P112-55 | TV | URM; PIP; SS | $500.00 |
| P066-91 | TV | RM; SS | $400.00 |
| P333-00 | TV | RM | $300.00 |

FIG. 16

| | | |
|---|---|---|
| 1802 → | RETAILER TRANSACTION IDENTIFIER: | RT-000-333-111 | ← 1804
| 1806 → | TIME: | 3/14/99 2:53 PM |
| | POS TERMINAL: | 0739 | ← 1808
| 1810 → | OPERATOR IDENTIFIER: | 18735102 |
| | TOTAL: | $178.91 | ← 1812
| | PAYEMENT TYPE: | CASH; INTERNET PRICING VOUCHER |

1800

| PRODUCT IDENTIFIER 1820 | PRODUCT PRICE 1830 |
|---|---|
| P064-44 | $49.99 |
| P107-77 | $118.00 |
| P304-44 | 0-1P |

FIG. 18

| RETAILER TRANSACTION IDENTIFIER 1910 | REDEMPTION CODE 1920 | PRODUCT IDENTIFIER 1930 | PAYMENT EXPECTED 1940 | PAYMENT STATUS 1950 |
|---|---|---|---|---|
| TR-000-333-111 | 1234-5678-1234 | P304-44 | $200.00 | PENDING |
| TR-111-222-333 | 1234-5678-1235 | P089-55 | $250.00 | RECEIVED |
| TR-666-777-888 | 1234-5678-1236 | P999-99 | $75.00 | RECEIVED |

FIG. 19

| PRODUCT IDENTIFIER 2010 | RETAIL PRICE 2020 | SETTLEMENT PRICE 2030 |
|---|---|---|
| P304-44 | $220.00 | $200.00 |
| P089-55 | $270.00 | $250.00 |
| P999-99 | $75.00 | $75.00 |
| P133-44 | $180.00 | $175.00 |

FIG. 20

| REDEMPTION CODE 2111 | STATUS 2112 |
|---|---|
| 1111-4593-2943-8920 | AVAILABLE |
| 1111-9403-0297-4673 | ISSUED |
| 1111-4689-0938-9200 | ISSUED |
| 1111-3809-7267-0182 | AVAILABLE |

FIG. 21A

| REDEMPTION CODE 2121 | STATUS 2122 | OFFER IDENTIFIER 2123 | RETAILER IDENTIFIER 2124 | RETAILER IDENTIFIER 2125 | RETAILER IDENTIFIER 2126 |
|---|---|---|---|---|---|
| 1111-9403-0297-4673 | REDEEMED | T103-222-012 | 903352617980002 | 843002912093640 | 930299012239019 |
| 1111-4698-0938-9200 | REDEEMED | T103-221-99 | 783022106297066 | 652009421000011 | 540096318889560 |
| 1111-5023-5639-9210 | REDEEMED | T102-321-12 | 738882019836210 | 903352617980002 | 203661094321007 |
| 1111-6290-9126-7533 | UNREDEEMED | T123-111-55 | 203661094321007 | N/A | N/A |

| OFFER IDENTIFIER 2131 | PAYMENT IDENTIFIER 2133 | AUTHORIZED AMOUNT 2133 | CHARGED AMOUNT 2134 |
|---|---|---|---|
| T103-222-010 | 5555-0013-9268-0192 | $216.00 | $213.00 |
| T103-222-012 | 2222-9230-0192-9367 | $1,100.00 | $1,065.00 |
| T104-333-432 | 3333-0978-2710-8723 | $2,200.00 | $2,105.00 |
| T471-274-483 | 7777-9087-1023-5436 | $330.00 | N/A |

| OFFER IDENTIFIER 2141 | RETAILER IDENTIFIER 2142 | PRODUCT IDENTIFIER 2143 | SELLER IDENTIFIER 2144 | ESTABLISHED PRICE 2145 | INITIAL ADDITIONAL CHARGE 2146 | SUBSEQUENT ADDITIONAL CHARGE 2147 | FINAL PRICE 2148 |
|---|---|---|---|---|---|---|---|
| T989-442-453 | 903352617980002 | P1130 | S18790 | $200.00 | 8.0% SALES TAX ($16.00) | -1.5% SALES TAX ($3.00) | $213.00 |
| T964-647-121 | 783022106297906 | P9034 | S56234 | $1,000.00 | 6.5% SALES TAX ($65.00) | $0.00 | $1,065.00 |
| T432-827-279 | 738882019836210 | P8723 | S02281 | $2,000.00 | 4.0% SALES TAX ($80.00) | $25.00 LATE PICK UP PENALTY | $2,105.00 |
| T103-222-012 | 203661094321007 | P0029 | S97610 | $300.00 | 6.5% SALES TAX ($19.50) | N/A | N/A |

PURCHASING SYSTEMS AND METHODS WHEREIN A BUYER TAKES POSSESSION AT A RETAILER OF A PRODUCT PURCHASED USING A COMMUNICATION NETWORK

CROSS-REFERENCE TO RELATED APPLICATIONS

The present application is a continuation-in-part of U.S. patent applications Ser. No. 08/889,503 filed Jul. 8, 1997 and entitled "System and Process for Local Acquisition of Products Priced Online" (97-032); Ser. No. 08/889,319 filed Jul. 8, 1997 and entitled "Conditional Purchase Offer Management System" (96-008X); Serial No. 09/190,744 filed Nov. 12, 1998 and entitled "Method and Apparatus for A Cryptographically Assisted Commercial Network System Designed to Facilitate Buyer-D Conditional Purchase Offers" (96-008XXX), which is a continuation in-part application Ser No. 08/707,660, now of U.S. Pat. No. 5,794,207, filed Sep. 4, 1996; and Ser. No. 09/083,345 filed May 22, 1998 and entitled "Method and Apparatus for Managing Remote Vending Machine Transactions" (97-554). The entire contents of these applications are hereby incorporated by reference.

The present application is also related to the subject matter of U.S. patent applications Ser. No. 08/943,483 filed Oct. 3, 1997 and entitled "System and Method for Facilitating Acceptance of Conditional Purchase Offers" (97-072); Ser. No. 08/858,738 filed May 19, 1997 and entitled "System and Process for Issuing and Managing Forced Redemption Vouchers Having Alias Account Numbers" (96-139); and Ser. No. 08/997,680 filed Dec. 23, 1997 and entitled "Method and Apparatus for Issuing and Managing Gift Certificates" (96-139X). The entire contents of these applications are hereby incorporated by reference.

FIELD OF THE INVENTION

The present invention relates to the sale of products. In particular, the present invention relates to purchasing systems and methods wherein a buyer takes possession at a retailer of a product purchased using a communication network.

BACKGROUND OF THE INVENTION

Typically, a buyer visits one or more retailers to shop for a product. When the buyer finds the product he or she is looking for, at a reasonable price, the buyer purchases the product from the retailer. This traditional method of providing products to buyers, however, may require that the buyer visit a number of retailers to determine a reasonable price for the product.

Moreover, the traditional method of selling a product to a buyer requires that a retailer attract buyers, such as by spending money on advertising. For example, when a new retail store opens for business, many buyers will not know what products the store sells. In addition, traditional methods do not let a product manufacturer establish a pricing relationship directly with buyers when the product is provided to buyers through one or more retailers. For example, a manufacturer may sell a product to a retailer (perhaps through a distributor) that ultimately decides the price at which the product is sold to buyers.

Recently, products have been sold to buyers through communication networks, such as with online transactions completed through the Internet. Internet sales have been growing steadily over the past few years, and are expected to continue increasing because buyers are attracted to the ease and convenience of shopping online. For example, a buyer can shop online from the comfort of home at any time of day or night.

Another advantage of online shopping is that pricing comparisons are less time consuming. For example, a Web service can compile prices from various sources (e.g., Web merchants and/or retail stores that are not online) for various products. This lets a buyer easily find and select, for example, a retail store that offers the lowest price for a product. Although this will save a buyer time, only regular retail prices (which the buyer would eventually be able to find without the Web site) are typically reported—without providing any other pricing advantage. As price information becomes more accessible, buyers are growing more price sensitive and demand that products be sold at lower prices.

Having a product shipped to a buyer, which is the conventional mode of delivering a product purchased online, presents several drawbacks. For example, many buyers are not home during the day and cannot sign for, or otherwise arrange to receive, the product from a delivery service. In addition, the shipping service itself presents an additional cost that, depending on the product, may offset any savings made possible by shopping online. Finally, some products simply cannot be delivered at all, such as a service provided to buyers.

With respect to a buyer, another disadvantage of online shopping is the delay involved with receiving a product. The online shopping community has not effectively captured the impulsive and impatient buyer market, because a buyer is more likely to impulsively purchase a product when he or she can take immediate possession (instead of waiting several days for delivery). In other words, a buyer who wants a product immediately is likely to visit a retailer and not buy the product online.

With respect to retail stores that are not online, online shopping presents additional problems. For example, the store is typically left completely out of any online shopping transaction. In addition to losing the potential profit from the sale of the product itself, the store loses any chance of selling the buyer additional items during a visit, such as peripherals for the product or even unrelated items that attract the buyer's attention while he or she is in the store. This would still be a problem even if the store invested the time and money required to establish an online shopping service. Moreover, the store's online service may simply shift sales that would have otherwise occurred at the actual store (as opposed to attracting new buyers).

With respect to manufacturers, the availability of online shopping does little to solve the problem of establishing a pricing relationship directly with buyers. Some manufacturers have attempted to establish such a relationship by establishing an online shopping service. However, manufacturers that establish such a service compete directly with their retailer's traditional distribution channel and therefore risk alienating retailers that also sell the manufacturer's product.

A need therefore exists for methods and systems that use the capabilities and convenience of online shopping to provide buyers with reasonable pricing for products and satisfy the needs of an individual buyer more effectively. A further need exists for a system that allows the online sales industry to capture the impulsive and impatient buyer market.

SUMMARY OF THE INVENTION

To alleviate the problems inherent in the prior art, the present invention introduces purchasing systems and methods wherein a buyer takes possession at a retailer of a product purchased using a communication network.

In one embodiment of the present invention, a purchasing system communicates with a buyer through a communication network to establish a first price for a product between the buyer and a seller. The purchasing system also arranges for the buyer to take possession of the product at a retailer, different from the seller, that offers the product for sale at a second price. Verification information, which enables the retailer to authorize the buyer to take possession of the product, is transmitted to the retailer. The buyer provides a payment, based on the first price, to the purchasing system in exchange for the right to take possession of the product at the retailer.

In another embodiment, a purchasing system receives a buyer offer, including an offer price, related to a product desired by a remote, prospective buyer. The purchasing system arranges for the prospective buyer to purchase the product. The purchasing system also arranges for the buyer to take possession of the product at a retailer.

In another embodiment, a purchasing system arranges for a buyer to purchase a product and transmits redemption information, including a redemption code, to the buyer. The redemption information may also include information that enables the creation of a voucher to be used when taking possession of the product at a retailer.

In still another embodiment of the present invention, the purchasing system again arranges for a buyer to purchase a product and transmits redemption information, including a redemption code, to the buyer. Information related to an attempt to take possession of the product, including the redemption code, is received by the purchasing system from a retailer, and a verification authorizing the buyer to take possession of the product is sent to the retailer.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 6 is a tabular representation of a portion of a product category database according to an embodiment of the present invention.

FIGS. 9A to 9D are tabular representations of portions of product databases according to embodiments of the present invention.

FIG. 10A is a tabular representation of a portion of a seller database according to an embodiment of the present invention.

FIG. 11 is a tabular representation of a portion of a retailer database according to an embodiment of the present invention.

FIGS. 12A and 12B are tabular representations of portions of an offer database according to an embodiment of the present invention.

FIG. 13 is a tabular representation of a portion of a supplemental offer database according to an embodiment of the present invention.

FIG. 14 is a tabular representation of a portion of an accepted offer database according to an embodiment of the present invention.

FIG. 15 is a tabular representation of a portion of a settlement price database according to an embodiment of the present invention.

FIG. 16 is a tabular representation of a portion of a seller product database according to an embodiment of the present invention.

FIG. 18 is a tabular representation of a portion of a record of a retailer transaction database according to an embodiment of the present invention.

FIG. 19 is a tabular representation of a portion of a purchasing system transaction database according to an embodiment of the present invention.

FIG. 20 is a tabular representation of a portion of a pricing database according to an embodiment of the present invention.

FIGS. 21A to 21D are tabular representations of portions of databases that may be used to issue, track and authorize the redemption of redemption codes in the format of a credit card account number, in accordance with one embodiment of the present invention

DETAILED DESCRIPTION OF THE INVENTION

Figure 1A:
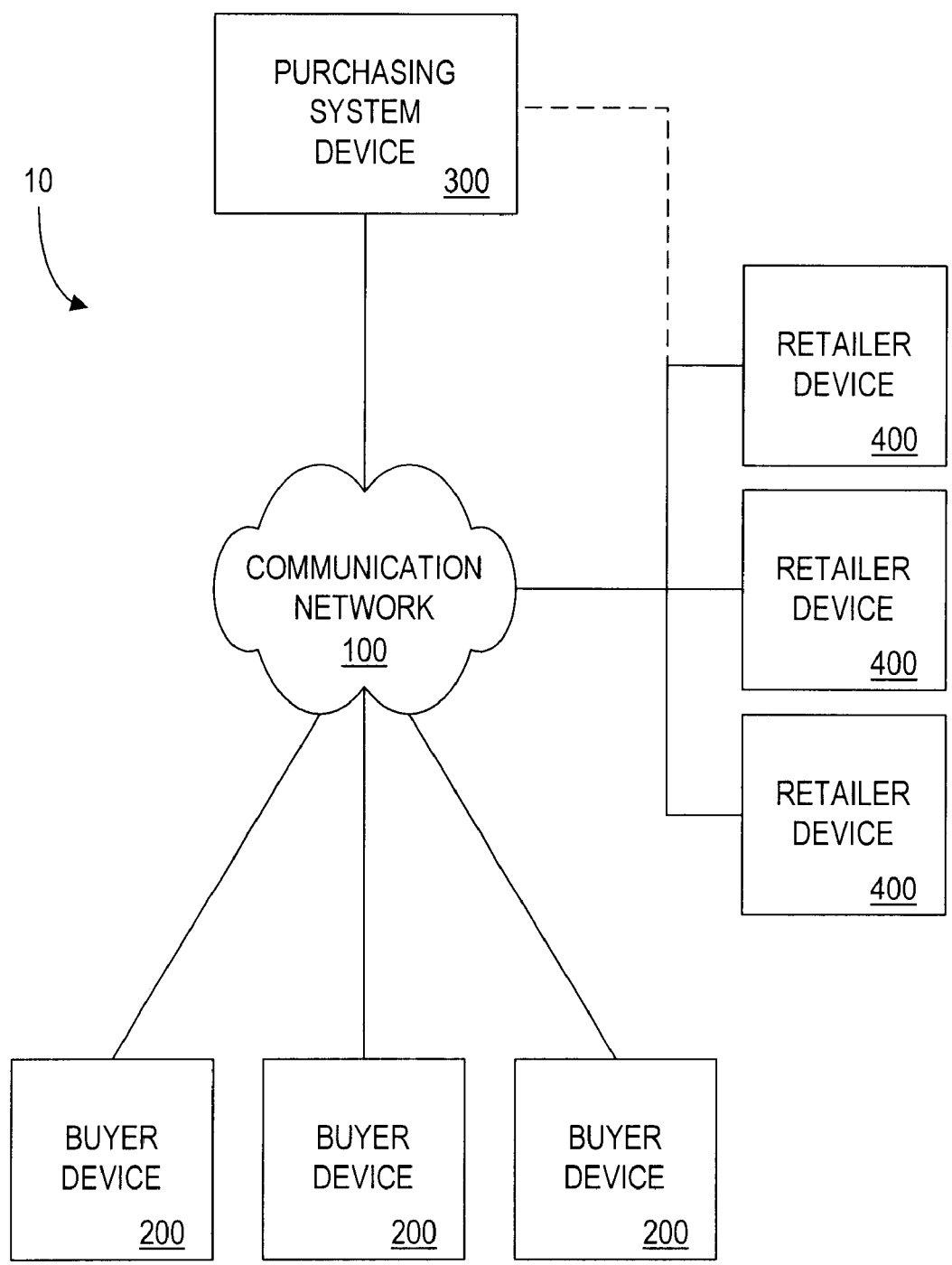
FIGS. 1A and 1B are block diagram overviews of systems in which a buyer takes possession of a product at a retailer according to embodiments of the present invention.

The present invention is directed to purchasing systems and methods wherein a buyer takes possession of a product at a retailer. Turning now in detail to the drawings, FIG. 1A is a block diagram overview of a system 10 according to one embodiment of the present invention. The system 10 includes a number of buyer devices 200 coupled to a purchasing system device 300 through a communication network 100. The buyer devices 200 may be, for example, Personal Computers (PCs), Personal Digital Assistants (PDAs), wired or wireless telephones, one-way or two-way pagers, kiosks, Automated Teller Machines (ATMs), watches enabled to communicate with the network 100, or any other appropriate communication device.

The communication network 100 may be, for example, a Local Area Network (LAN), a Wide Area Network (WAN), a wireless network, a Public Switched Telephone Network (PSTN), or an Internet Protocol (IP) network such as the Internet, an intranet or an extranet. In one embodiment, the buyer devices 200 communicate with a remote Web-based purchasing system device 300 through the Internet.

According to an embodiment of the present invention, the purchasing system device 300 receives a buyer offer, including a buyer-defined offer price, related to a product to be purchased. The buyer offer may be "binding" in that if a seller agrees the accept the offer the buyer cannot revoke the offer. One example of a buyer offer, called a Conditional Purchase Offer (CPO), is described in U.S. Pat. No. 5,794,207 and U.S. patent application Ser. No. 08/889,319, the entire contents of which are hereby incorporated by reference. A CPO may be, for example, an electronic message from a buyer including an offer price for a product. If a seller agrees to the CPO, the buyer pays the offer amount to the purchasing system and the product is provided to the buyer by a retailer. The purchasing system, in turn, provides a payment to the retailer for providing the product to the buyer. Such a payment to the retail will be referred to herein as a "settlement" amount, and may be equal to, less than or more than the retail price the retailer typically charges customers for the product.

In addition to an offer price, the buyer offer can include other information, such as a product category, a product class, a product manufacturer and model number, and one or more product features. For example, the buyer offer may indicate that the buyer will pay $500 (the offer price) for a television (the product category) made by a well-respected manufacturer and having a 32 inch screen (the product class) and surround sound (a product feature).

The buyer offer may be received from a buyer device 200 through the communication network 100. According to one embodiment, the purchasing system device 300 arranges for the buyer to purchase the product from a "seller," such as the product manufacturer, a retailer, the purchasing system or any other party. The purchasing system device 300 also arranges for the buyer to take possession of the product at a retailer.

It should be noted that, as used herein, a "product" may be, for example, a new or used consumer product such as an electronic device. A product may also be any other good or service that a buyer can take possession of at a retailer. In the case of a service, the product may be, for example, a car tune-up that the buyer "takes possession of" at (i.e., receive receives the service from) a car service center. A product may also be a package of multiple items and/or services. For example, a product may be a television and a Video Cassette Recorder (VCR). In this case, the purchasing system could arrange for the buyer to take possession of both items at a single retailer or at different retailers.

As used herein, a "retailer" may be any entity capable of providing a product to a buyer. For example, a retailer might be a single retail shop, a chain of consumer electronic "superstores," one or more retail stores within a chain, a franchisee, a franchiser, or even a warehouse where products are stored.

According to an embodiment of the present invention, the buyer pays the purchasing system in exchange for the right to take possession of the product at the retailer. The retailer receives a payment, which may or may not be based on the amount paid by the buyer, from a party other than the buyer, such as the purchasing system or product manufacturer, in exchange for providing the product to the buyer.

In another embodiment of the present invention, the purchasing system device 300 communicates with the buyer device 200 through the communication network 100 to establish a first price for a product between the buyer and a seller. The purchasing system device 300 also arranges for the buyer to take possession of the product at a retailer, different from the seller, that offers the product for sale at a second price. Verification information, which enables the retailer to authorize the buyer to take possession of the product, is transmitted from the purchasing system device 300 to a retailer device 400. The verification information may be, for example, a one way hash function transmitted to the retailer (either once or periodically). The retailer may then evaluate a redemption code provided by the buyer, using the one way hash function, to determine if the buyer is authorized to take possession of the product. The verification information may also be, for example, a response to information (sent from the retailer device 400 to the purchasing system device 300) about an attempt to take possession of a product, or a batch of authorized codes sent to the retailer device 400 each night. The buyer provides a payment, based on the first price, to the purchasing system in exchange for the right to take possession of the product at the retailer. The purchasing system, in turn, provides payment to the retailer for allowing the buyer to take possession of the product.

According to another embodiment of the present invention, the purchasing system device 300 arranges for a buyer to purchase a product and transmits redemption information, including a "redemption code," to the buyer device 200, such as through the communication network 100. As used herein, a "redemption code" may be, for example, a unique alphanumeric sequence of digits. In general, however, the redemption code may be anything capable of being identified, such as a one or two dimensional bar code, that represents the right of the buyer to take possession of the product at a retailer. As used herein, the phrase "bar code" includes any machine readable information. The redemption information can also include information that enables the creation of a voucher. For example, a printer attached to a PC may be used to print a coupon-like voucher including the redemption code.

According to still another embodiment of the present invention, information related to an attempt to take possession of the product, including the redemption code, is sent from a retailer device 400 to the purchasing system device 300. In this case, the purchasing system device 300 can send back a verification, authorizing the buyer to take possession of the product, to the retailer device 400. Although FIG. 1A shows the purchasing system device 300 communicating with the retailer device 400 through the same communication network 100 used by the buyer device 200, those skilled in the art will recognize that a different communication network may be used instead (as indicated by the dashed line in FIG. 1A).

A more detailed description of one embodiment of the present invention will now be provided with respect to FIG.

1B. As before, the system 20 includes a number of buyer devices 210 (such as PCs executing browser application software) coupled to a purchasing system device 310 (such as a Web server) through the Internet 110. Although embodiments of the present invention will be described with respect to information exchanged using a Web site, according to other embodiments of the present invention information may instead be exchanged using, for example: a telephone; a facsimile machine; e-mail; a WebTV interface; a cable network interface, or a wireless device. Information exchanged between a buyer and purchasing system device 310, as well as between a retailer and the purchasing system device 310, may also use a Voice Response Unit (VRU) or Interactive VRU (IVRU). Examples of IVRUs include the Vision 2001 and the Insight IVR/Web from Interactive Voice Technologies, Corp. and the OmniVox for Windows NT from APEX Voice Communications. An IVRU lets a user of a DTMF (Dual Tone Multi-Frequency) tone generating telephone, also known as "push button" telephone, communicate with a computer. The DTMF signals received from a user's telephone are interpreted by an IVRU server, and the server may also communicate with the user by generating and transmitting voice or other audio signals, such as a list of IVRU menu options.

The purchasing system device 310 arranges for the buyer to purchase the product, for example, when a buyer offer is received from a buyer device 210 through the Internet 110. As explained in greater detail with respect to FIGS. 2 and 3, the purchasing system device 310 may or may not route information about the buyer offer to, for example, a number of seller devices 510.

Based on the buyer offer information, the purchasing system device 310 may select a particular product (such as a manufacturer and model number) from a plurality of possible products. In addition to the buyer offer information, the purchasing system device 310 may also consider other factors when selecting a particular product, such as, for example: (i) the expected availability of products at retailers; (ii) the actual availability of product at retailers—which may be done by communicating with the retailer devices 410; (iii) retail prices of products at various retailers—which again may be done by communicating with the retailer devices 410; (iv) subsidy information associated with products; and (v) retailer settlement prices. As used herein, a "subsidy" is an amount a party (such as a manufacturer, a retailer or the purchasing system) is willing to contribute towards the buyer's purchase of a product.

By way of example, consider a buyer who sends the purchasing system device 310 an offer to purchase a 35 millimeter (mm) camera for $150. The purchasing system device 310 and/or the seller devices 510 may determine that cameras produced by two different manufacturers can be used to fulfill the buyer's offer. Both cameras are available at a retailer for the same settlement price of $175. One of the manufacturers, however, has agreed to provide a $35 manufacturer subsidy for each camera sold. In this case, the purchasing system device 310 may select the camera produced by that manufacturer to accept the buyer's offer and realize a $10 gain (i.e., the buyer's offer price of $150 less the retailer's settlement price of $175 plus the manufacturer subsidy of $35).

The purchasing system device 310 may likewise select one or more retailers from a plurality of possible retailers. In this case, the purchasing system device 310 may consider, for example: (i) the location of the buyer; (ii) the location of the retailers; (ii) the expected availability of the product at various retailers; (iii) the actual availability of the product at various retailers; (iv) retail prices of the product at the retailers; (iv) retailer subsidy information; and (v) retailer settlement prices.

To determine whether or not the buyer offer is acceptable and/or how the buyer offer will be accepted (e.g., which product at which retailer), the purchasing system device 310 may compare the offer price with a settlement price associated with a product that successfully meets the buyer's offer information. A settlement price may be, for example, the amount that must be provided to a retailer by the purchasing system in exchange for providing a product to a buyer. A potential seller may also have a minimum acceptable price, which is the lowest price that the seller (as opposed to the retailer) will let the product be sold for (e.g., to prevent brand name dilution). In making this comparison, the purchasing system device 310 may also take into account supplemental price information, such as a manufacturer subsidy amount, a retailer subsidy amount, a purchasing system subsidy amount, and/or a "third-party" subsidy amount associated with the product. As used herein, a third-party subsidy amount may be, for example, an amount that a third-party agrees to provide in exchange for a promise regarding, an action by, or information about the buyer. For example, a credit card company may agree to add $50 towards the purchase of a home stereo if a buyer submits a credit card application to the company. See, for example, U.S. patent application Ser. No. 08/943,483 filed Oct. 3, 1997 and entitled "System and Method for Facilitating Acceptance of Conditional Purchase Offers" (97-072), the entire contents of which are hereby incorporated by reference.

According to embodiments of the present invention, the purchasing system device 310 also arranges for the buyer to take possession of the product at a retailer. This may be done, for example, by sending to the buyer redemption information, including a redemption code such as a "pseudo" credit card number, debit card number or a checking account number. A redemption code may be a "pseudo" credit card number if, for example, it can be entered into (and processed by) a retailer device, such as a Card Authorization Terminal (CAT) device, as if it was a real credit card number. The redemption information can also include a condition that must be met by the buyer, such as a geographic limitation or an expiration date. Penalty information, such as a 10% increase in the price of the product charged to the buyer, may also be included in the event the buyer violates one of the conditions of the sale. The redemption information may also enable the creation of a coupon-like voucher. For example, the redemption information may let the buyer print out a voucher that can be presented to the retailer when taking possession of the product.

Note that the redemption information may include information associated with a number of products, as well as a number of retailers. For example, a single voucher might indicate that the buyer can take possession of a VCR at either of three local retailers. In this case, the voucher may be redeemable for one of several different products, depending on the retailer at which the buyer takes possession of the product. Accordingly, the redemption information (e.g., a voucher), may include several different Stock Keeping Unit (SKU) numbers, model names and/or model numbers. According to another embodiment, the voucher may include several separate products (e.g., a television or a VCR) or several equivalent products (e.g., several different television brands, more than one of which may be available at a single retailer).

The redemption information may also include supplemental offer information. For example, the voucher may include an offer to purchase a pack of three VCR tapes for $1 to the buyer if the buyer takes possession of the VCR at a particular retailer.

When the buyer presents the voucher to a retailer, the retailer device 410 sends information related to an attempt to take possession of the product (such as the redemption code included on the voucher) to the purchasing system device 310. The retailer devices 410 may comprise, for example, inventory systems that periodically update the purchasing system device 310 and/or Point Of Sale (POS) devices, such as a POS controller that communicate with POS terminals (not shown in FIG. 1B) and the purchasing system device 310 during the redemption process. A POS terminal may include an optical bar code scanner to read bar codes on products and/or vouchers and a card reader to read cards such as magnetic strip cards that have magnetizable strips or surfaces on which data can be recorded. One such card reader is the OMNT™ 1450 payment terminal, manufactured by VeriFone, Inc., which includes a built-in, magnetic-stripe reader, a Personal Identification Number entry pad (e.g., one used buy a buyer to enter a debit card PIN) and an integrated smart card reader.

The purchasing system device 310 may communicate with the retailer device 410 in real time during the redemption of a voucher. That is, a POS controller may connect to the purchasing system device 310 when a buyer is attempting to take possession of the product. In another embodiment, the retailer device 410 and the purchasing system device 310 communicate periodically, such as every night at midnight. For example, the purchasing system device 310 could communicate with each retailer device 410 daily regarding the buyer redemption codes, redeemable at the retailer, that have been issued. Likewise, the retailer device 410 can in turn transmit to the purchasing system device 310 a list of the redemption codes that have been redeemed at the retailer in the last 24 hours. In some embodiments, the retailer is the seller who accepts a buyer's offer. In such an embodiment, the retailer device 410 could also perform the function of, or be in communication with another server that performs the function of, a potential seller.

When the retailer device 410 sends information related to an attempt to take possession of the product (such as a redemption code) to the purchasing system device 310, the information can be used to authorize the buyer to take possession of the product. That is, the purchasing system device 310 can send a verification back to the retailer device 410 authorizing the retailer to let the buyer take possession of the product. The purchasing system device 310 may also provide a payment to the retailer in exchange for providing the product to the buyer. In this case, of course, the amount paid to the retailer may or may not be equal to the offer amount paid by the buyer. For example, suppose the purchasing system arranges for a buyer to purchase a television for $300, and the buyer takes possession of the television at a retailer (one of several indicated on the voucher) that typically sells that television for $320. In this case, the purchasing system may pay the full retail price (i.e., $320) to the retailer.

Note that some or all of the actions associated with the purchasing system device 310 may be performed by a retailer, a product manufacturer, or a party other than the retailer and product manufacturer.

Figure 2A:
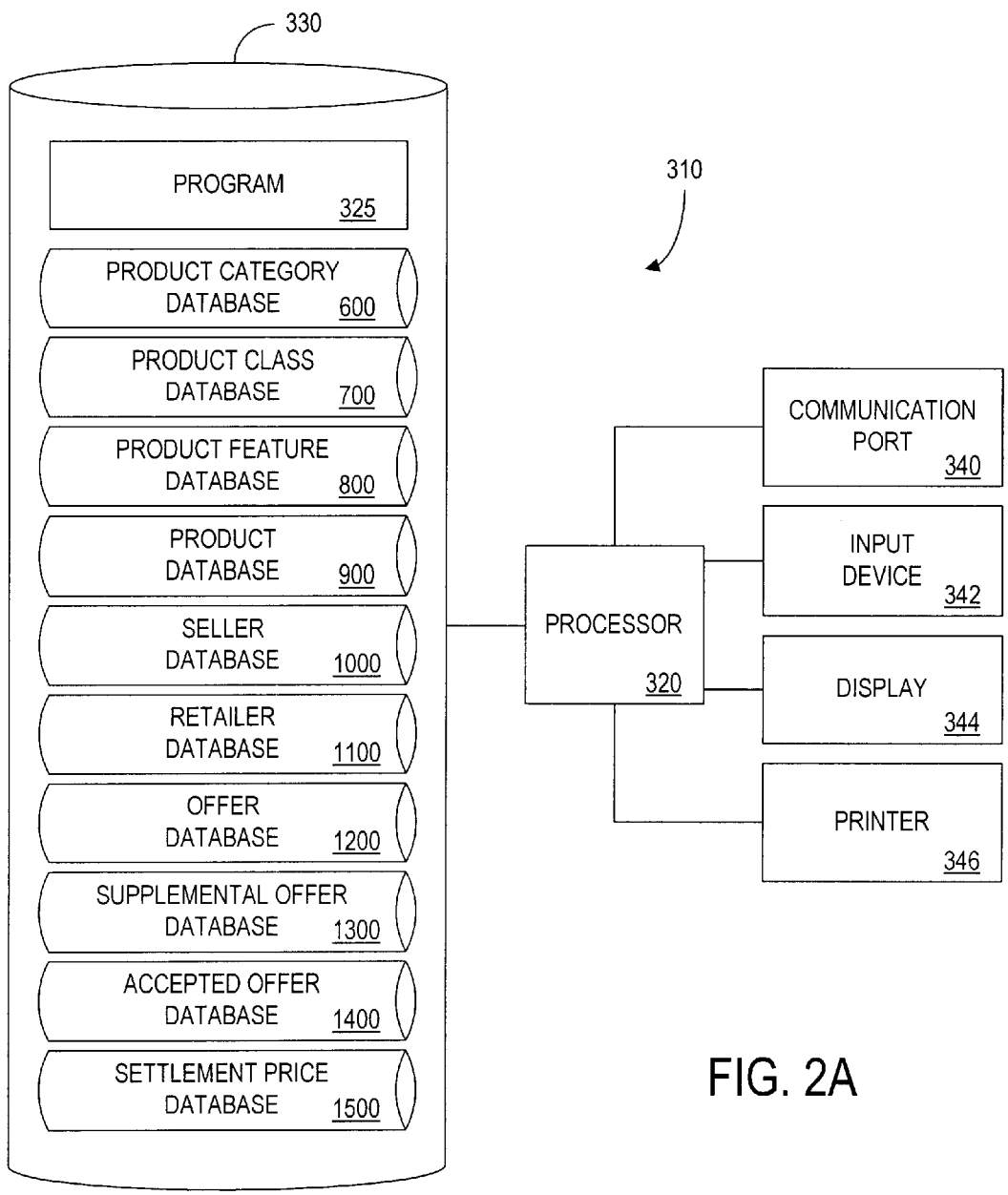
FIGS. 2A and 2B are block schematic diagrams of purchasing system devices according to embodiments of the present invention.
Figure 2B:
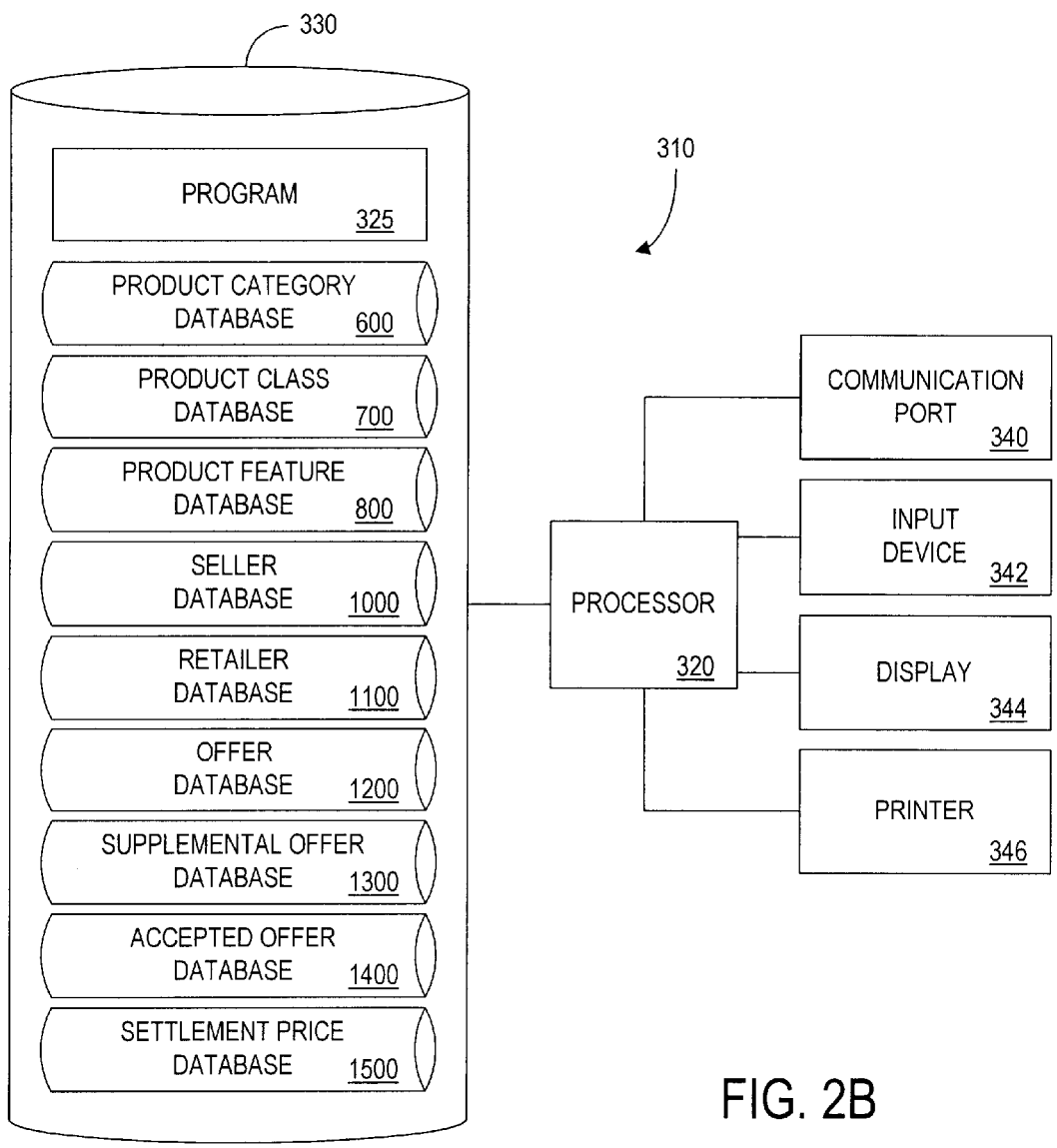

The operation of the purchasing system device 310 will now be described in greater detail with respect to two embodiments of the present invention: a "local database" embodiment (FIG. 2A); and a "routing embodiment" (FIG. 2B). Those skilled in the art, however, will recognize that these embodiments are merely illustrations and that many other embodiments of the present invention are possible.

Purchasing System Device—Local Database Embodiment

Figure 1B:
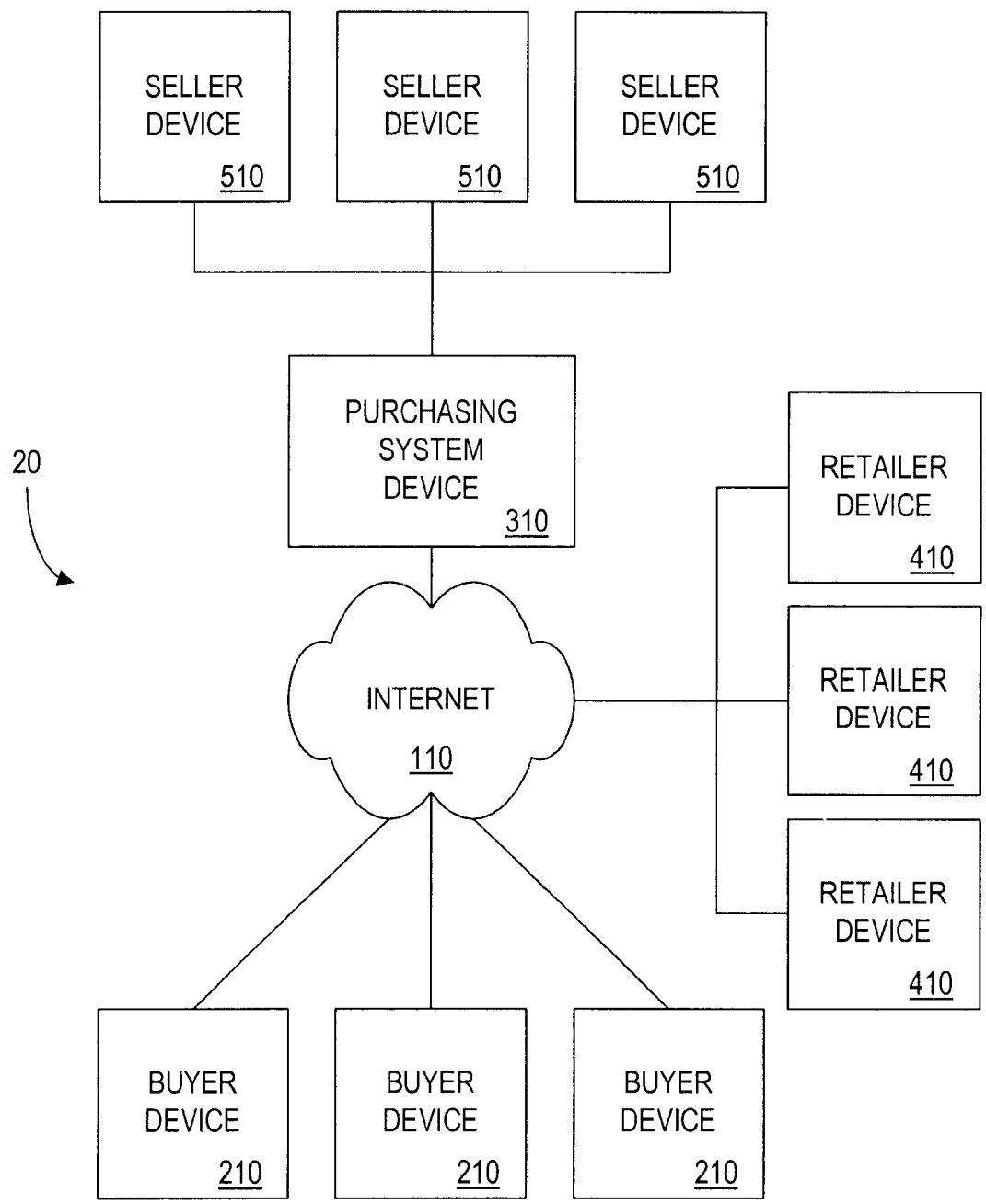

FIG. 2A illustrates a purchasing system device 310 that is descriptive of the device shown in FIG. 1B according to a "local database" embodiment of the present invention, wherein the information about products (available from sellers) for sale through the purchasing system is stored locally at the purchasing system device 310. The purchasing system device 310 comprises a processor 320, such as one or more Pentium® processors, coupled to: a communication port 340 configured to communicate through a communication network (not shown in FIG. 2A); an input device 342 (such as a keyboard or mouse); a display 344; and a printer 346. The communication port 340 may be used to communicate with, for example: (i) a plurality of seller devices 510; (ii) a plurality of buyer devices 210; and/or (iii) a plurality of retailer devices 410. The sellers may comprise, for example, product manufacturers and/or retailers. The buyers may comprise individuals who "log onto" a Web site and submit offers to purchase products (i.e., buyer offers). The Web site may be: (i) hosted by a server at the purchasing system device 310 or (ii) hosted by a server coupled to the purchasing system device 310.

The processor 320 is also in communication with a data storage device 330. The data storage device 330 comprises an appropriate combination of magnetic, optical and/or semiconductor memory, and may include Random Access Memory (RAM), Read-Only Memory (ROM) and/or a hard disk. The processor 320 and the storage device 330 may each be (i) located entirely within a single computer or other computing device; (ii) connected to each other by a remote communication medium, such as a serial port cable, telephone line or wireless frequency transceiver; or (iii) a combination thereof. In one embodiment, the purchasing system device 310 may comprise one or more computers that are connected to a remote server computer for maintaining databases.

The data storage device 330 stores a program 325 for controlling the processor 320. The processor 320 performs instructions of the program 325, and thereby operates in accordance with the present invention, and particularly in accordance with the methods described in detail herein. For example, when a buyer offer is received, the purchasing system device 310 may arrange for the buyer to purchase a product and takes possession of the product at a retailer. Note that, as used herein, information may be "received" by, for example: (1) the purchasing system device 310 from a buyer device 210; or (2) a software application or module within the purchasing system device 310 from another software application, module or any other source.

The program 325 may be stored in a compressed, uncompiled and/or encrypted format. The program 325 furthermore includes program elements that may be necessary, such as an operating system, a database management system and "device drivers" used by the processor 320 to interface with peripheral devices. Appropriate device drivers and other necessary program elements are known to those skilled in the art and are not described in detail herein.

As shown in FIG. 2A, the storage device 330 also stores: a product category database 600 (described in detail with respect to FIG. 6); a product class database 700 (described in detail with respect to FIG. 7); a product feature database 800 (described in detail with respect to FIG. 8); a product database 900 (described in detail with respect to FIGS. 9A to 9D); a seller database 1000 (described in detail with respect to FIG. 10A); a retailer database 1100 (described in detail with respect to FIG. 11); an offer database 1200 (described in detail with respect to FIGS. 12A and 12B); a supplemental offer database 1300 (described in detail with respect to FIG. 13); an accepted offer database 1400 (described in detail with respect to FIG. 14); and a settlement price database 1500 (described in detail with respect to FIG. 15). The schematic illustrations and accompanying descriptions of the databases presented herein are exemplary, and any number of other database arrangements could be employed besides those suggested by the figures.

As will now be described, the purchasing system device 310 shown in FIG. 2A lets a buyer establish a price for a product using a communication network (e.g., through the Internet) with a seller (e.g., a product manufacturer or a retailer) before taking possession of, or "picking up," the product, such as a service, at a convenient retailer. The purchasing system device 310 may issue the buyer a redemption code, such as code included on a printed voucher, that is redeemable for the product at one or more "participating" local retailers. That is, the purchasing system has agreements with these retailers such that the retailers agree to honor pricing system vouchers for specific products.

According to an embodiment of the present invention, each participating retailer establishes "settlement prices" for those products it will exchange for vouchers. The settlement price is the amount that the purchasing system must provide to the retailer in exchange for honoring a voucher. A retailer may set the settlement price below, at or above the product's retail price. The retailer may, for example, set the settlement price below the retail price for a give product to increase the likelihood of the purchasing system accepting a buyer's offer for the product and arranging for the buyer to take possession of the product at the retailer, thus generating additional traffic for the retailer (i.e., the buyers who come to the store to redeem vouchers).

In another embodiment of the present invention, a product manufacturer (acting as a seller) can bypass a retailer's pricing structure and establish a price for a product directly with a buyer without the burden of delivering the product to the buyer. Similarly, an embodiment of the present invention lets a retailer (acting as a seller) establish a price for a product with a particular buyer without lowering the price for the product typically charged at a retail store. This can attract new buyers without giving a discounted price to all customers who visit the retail store.

The purchasing system device 310 shown in FIG. 2A is referred to herein as a "local database" embodiment because the information needed to find and select a product to fulfill a buyer offer is locally stored in the product database 900. The purchasing system device 310 can also locally store available inventory submitted by sellers. For example, a seller may submit to the purchasing system device 310: (i) a description of the product to be sold by the purchasing system; (ii) the number of products available for sale; and (iii) any minimum price below which the seller will not agree to sell the product. In another embodiment, a seller's or retailer's actual inventory database (e.g., those products that are currently in a store or warehouse) can instead be linked to the purchasing systems product database 900, using distributed database techniques that are well known in the art.

The seller may add or remove products from the purchasing system inventory based on factors such as: (i) actual or forecast product demand (e.g., the sales rate); (ii) product age/perishability (e.g., discounting the product when it gets close to it's expiration date); (iii) product life cycle (e.g., new model is coming out soon); (iv) competitive forces (e.g., attempting to sell more of a product than a competitor is selling of a similar product); and/or (v) actual or forecast profitability of the product (e.g., margin/volume trade-off thresholds).

The purchasing system device stores product information, such as in the product database 900, for use when evaluating a buyer offer. In effect, the purchasing system device 310 acts as an "agent" for a seller when deciding whether or not to accept a buyer offer on the seller's behalf.

In contrast to the "routing" embodiment described with respect to FIG. 2B, in this embodiment the purchasing system device 310 does not route, or "broadcast," a buyer offer to one or more sellers. Note that the local database and routing embodiments are not mutually exclusive. That is, the purchasing system device 310 could locally store information with respect to certain sellers, and route buyer offers to other sellers. Similarly, the purchasing system device 310 could locally store some information with respect to a particular seller (such as a minimum price), but still route a buyer offer to that seller (such as to let that seller evaluate product inventory in order to determine whether or not to accept a particular buyer's offer).

A buyer offer received by the purchasing system device 310 is stored in the offer database 1200 and may include, for example: (i) product requirements; (ii) a buyer-defined offer price; and (iii) a payment identifier (e.g., a credit card account number). The buyer can specify product requirements by providing, for example: (i) a category of product (e.g., a television); (ii) a class of product (e.g., class I encompassing the top three manufacturers or all 21 inch screen televisions); (iii) a product manufacturer of a product; (iv) a model number of a product; and/or (v) features that the product must include (e.g., a remote control). The product category, class and feature databases 600, 700, 800 are used to help the buyer define his or her offer and are described in detail with respect to FIGS. 6 to 8.

The buyer's product requirements determine which products stored in the product database 900 (if any) can be used to accept the buyer offer. If the purchasing system device 310 finds a product that matches the buyer's offer, the purchasing system device 310 decides whether or not to accept the offer (such as by comparing the buyer price, adjusted for any subsidies, with the settlement price). When an offer is accepted, the purchasing system device 310 sends redemption information, such as voucher information, to the buyer and stores the accepted offer in the accepted offer database 1400.

If an offer is not accepted by any seller, the purchasing system device 310 may take further steps to try to fulfill the offer. For example, the purchasing system device 310 may automatically post an advertisement with an online classified advertisement service for the product, indicating the buyer's interest in obtaining the product at the price established online. Similarly, the purchasing system device 310 may search online auction services and, if a suitable product is found, make bids for the product on behalf of the buyer (up to, for example, the buyer offer price less a purchasing system profit amount). Such steps may be taken by the purchasing system to obtain a new or previously owned product for the buyer. For example, when submitting a buyer offer, the buyer may be asked whether he agrees to accept a previously owned product if a new product cannot be found to fulfill the buyer's offer. In one embodiment, the buyer may establish two prices online: one price for a new product, effective if such a product can be found; and one price for a previously owned product effective if a new product cannot be found.

Purchasing System Device
Routing Embodiment

FIG. 2B is a block schematic diagram of a purchasing system device 310 according to a "routing embodiment" of the present invention. As in FIG. 2A, the purchasing system device 310 includes a processor 320 coupled to: a communication port 340; an input device 342; a display 344; and a printer 346. The processor 320 is also coupled to a storage device 330 that stores a program 325 containing instructions adapted to be executed by the processor 320 to perform at least one embodiment of the present invention.

As shown in FIG. 2B, the storage device 330 also contains a product category database 600 (described in detail with respect to FIG. 6); a product class database 700 (described in detail with respect to FIG. 7); a product feature database 800 (described in detail with respect to FIG. 8); a seller database 1000 (described in detail with respect to FIG. 10A); a retailer database 1100 (described in detail with respect to FIG. 11); an offer database 1200 (described in detail with respect to FIGS. 12A and 12B); a supplemental offer database 1300 (described in detail with respect to FIG. 13); an accepted offer database 1400 (described in detail with respect to FIG. 14) and a settlement price database 1500 (described in detail with respect to FIG. 15).

Note that, according to this embodiment, there is no product database 900 (which, in local database embodiment illustrated in FIG. 2A, stored products available for sale through the purchasing system device 310). In the routing embodiment, the purchasing system device 310 determines what seller to route the buyer's offer to, based on (for example) the product category, and the seller determines, based on the seller's product and pricing availability, whether to accept the buyer's offer. According to another embodiment of the present invention, Universal Product Category (UPC) codes associated with a product may be used, for example, to determine which sellers should receive a buyer offer.

An offer may be "routed" to a seller by, for example: (i) allowing the seller access to the purchasing system device 310's databases; (ii) using database replication (e.g., periodically replicate a subset of the data, such as by taking periodic snapshots of the data and sending it to a seller); or (iii) determining whether to send each offer, as it is received, to sellers. Each potential seller determines whether or not to fulfill a particular buyer's offer, for example: (i) with an automated rules-based program to evaluate incoming buyer offers; or (ii) manually, on an ad-hoc basis, by seller's personnel. The seller then transmits an acceptance/rejection for each offer to the purchasing system device 310. The rules-based program can use a database of products the seller is ready to sell through the purchasing system device 310 together with the associated settlement price for each of those products.

In one embodiment, when the purchasing system device 310 routes an offer to a seller, subsidy information is also be routed with the offer (such as by routing the minimum subsidy amount that the settlement system will require if the seller accepts the buyer's offer). Similarly, a seller may send subsidy information to the purchasing system device 310 when attempting to accept a buyer's offer in an attempt to be selected by the purchasing system device 310.

If more than seller accepts the buyer offer, the purchasing system device 310 may select which seller will be used to fulfill the buyer offer. The purchasing system device 310 may, for example, simply use the first acceptance that is received. The purchasing system device 310 may instead, for example, send an offer to a second group of sellers if, and only if, every one of a first group of sellers has rejected the offer. The purchasing system device 310 may also, for example, award the buyer offer to a seller that guarantees to deliver the product to the buyer within 2 hours (e.g., through a local courier service). Similar consideration may include, for example: (i) the seller's volume; (ii) the profit to the purchasing system; (iii) the profit to the retailer or manufacturer; and (iv) a pre-set ranking of sellers or classes of sellers. Note that these considerations may also apply in the previously described local database embodiment.

When a seller that has accepted a buyer offer is selected, the purchasing system device 310 stores the indication of the acceptance in the offer database 1200 and notifies the buyer of the acceptance. The purchasing system device 310 also creates a new record in the accepted offer database 1400, where the accepted offer and relevant information are stored (e.g., the redemption code issued to the buyer, an offer identifier which uniquely identifies the offer, and the retailer identifier(s) identifying the retailers at which the offer may be redeemed).

Seller Device
Local Database Embodiment

Figure 3A:
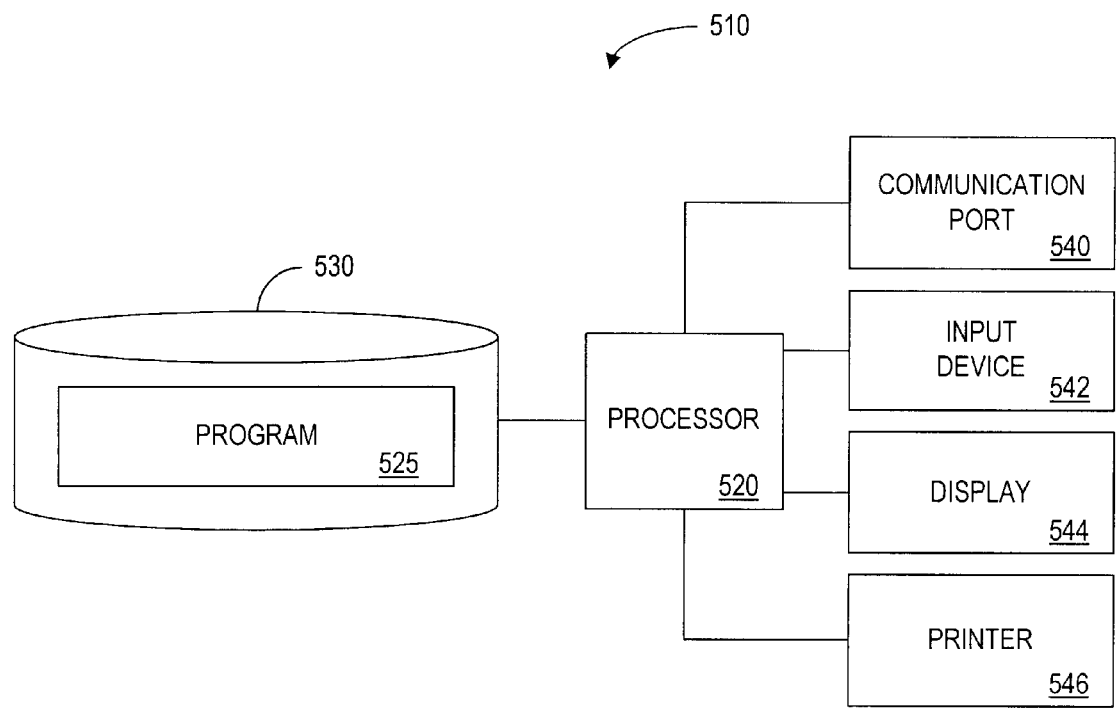
FIGS. 3A and 3B are block schematic diagrams of seller devices according to embodiments of the present invention.

FIG. 3A is a block schematic diagram of a seller device 510 according to the local database embodiment of the present invention. The seller device 510 includes a processor 520 coupled to: a communication port 540; an input device 542; a display 544; and a printer 546. The processor 520 is also coupled to a storage device 530 that stores a program 525 containing instructions adapted to be executed by the processor 520 to perform at least one embodiment of the present invention.

The seller device 510 communicates with the purchasing system device 310 using the communication port 540 to send information to be added to the product database 900. The information may include, for example: (i) what products the seller wants sold through the purchasing system; (ii) the settlement price that the seller is willing to accept for each of the products (if the seller is the retailer); (iii) in one embodiment, the quantity of a product that is available for sale through the purchasing system and/or the region in which the product or quantity of the product is available; and (iv) a minimum acceptable price (e.g., when the seller is a product manufacturer). The seller device 510 may receive such data from the seller's personnel via the input device 542. Alternatively, the seller device 510 may, based on a program or subroutine, determine: (i) what products to offer for sale through the purchasing system; (ii) the settlement prices for those products; and (iii) the quantity and regions of availability of the products. The seller device 510 may make such a determination based on, for example, the seller's current inventory and revenue management rules or predetermined rules input by the seller's personnel.

The seller device 510 additionally receives data from the purchasing system device 310 through the communication port 540. The received data may include: (i) the amount of payment owed by the seller for products sold through the purchasing system; and (ii) reports regarding the demand for products and the prices offered for the products from buyers using the purchasing system device 310. Such data may be provided to the seller's personnel on the display 544 or reports printed out with the printer 546.

Routing Embodiment

Figure 3B:
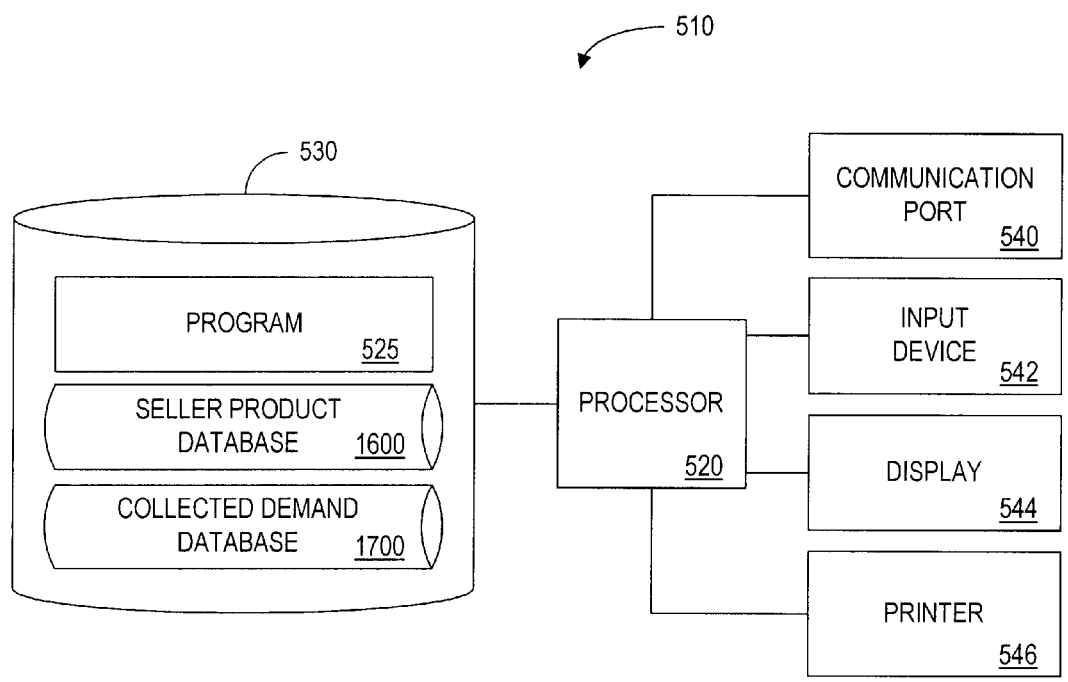

FIG. 3B is a block schematic diagram of a seller device according to the routing embodiment of the present invention. The seller device 510 includes a processor 520 coupled to: a communication port 540; an input device 542; a display 544; and a printer 546. The processor 520 is also coupled to a storage device 530 that stores a program 525 containing instructions adapted to be executed by the processor 520 to perform at least one embodiment of the present invention. As shown in FIG. 3B, the storage device 530 also contains a seller product database 1600 (described in detail with respect to FIG. 16) and a collected demand database 1700 (described in detail with respect to FIG. 17).

According to the routing embodiment, the seller stores the database of products available for sale through the purchasing system device 310. The seller device 510 may also store the "collected demand" for products (or for product descriptions that match the seller's products) directly as buyer offers are received from the purchasing system device 310. For example, the purchasing system device 310 may have 100 outstanding offers for a particular television model at a certain average price. While a seller may not wish to sell a single television at that price, it may agree to do so because the sale will involve 100 televisions (and therefore provide sufficient profit).

When a buyer offer is received by the seller, the seller queries a seller product database to determine, for example, whether: (i) there is a record whose product description successfully fulfills the product specified in the buyer's offer; and (ii) the offered price is at least equal to minimum acceptable price for that product. If the query results in a product that fulfills the buyer's offer, the seller accepts the offer and transmits the acceptance to the purchasing system device 310.

A seller may add inventory to the seller product database 1600 database: (i) automatically, for example, based on market conditions, such as the seller's current inventory or sales data (e.g., how many units of a particular product have sold within a predefined time period); or (ii) manually, on an ad hoc basis (e.g., based on current sales and inventory). According to one embodiment, when inventory of a product has remained stagnant for a predefined amount of time (i.e., the product is not selling), the product is automatically entered into the purchasing system database or the minimum acceptable price may be reduced, such as by 10%.

Buyer Device

Figure 4:
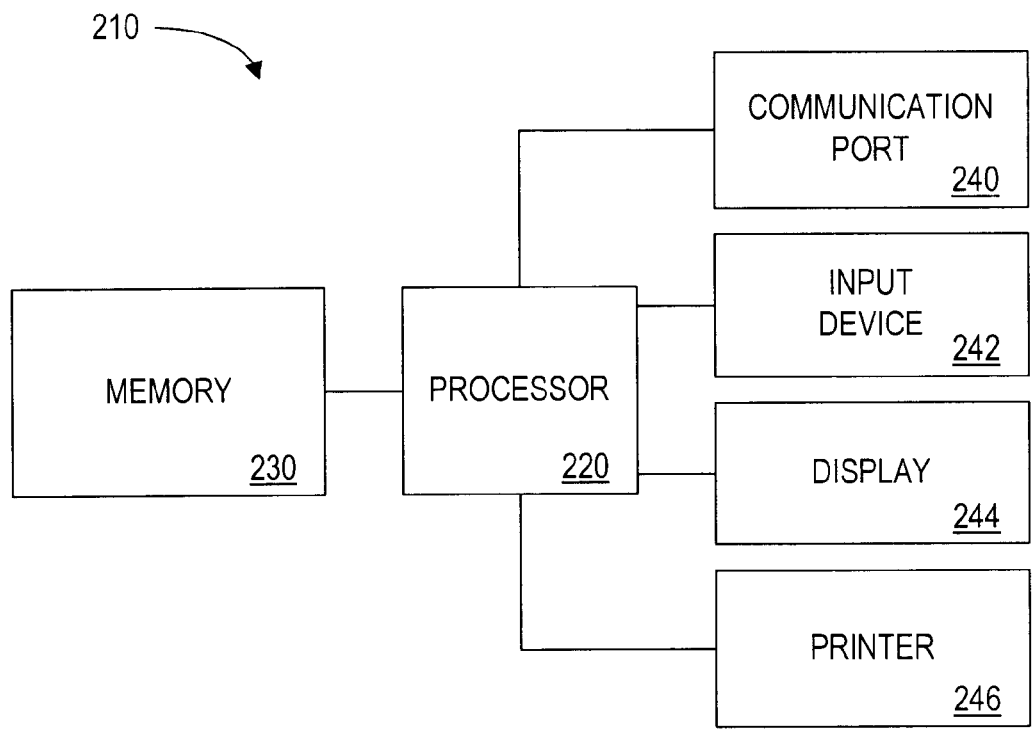
FIG. 4 is a block schematic diagram of a buyer device according to an embodiment of the present invention.

FIG. 4 is a block schematic diagram of a buyer device 210 according to an embodiment of the present invention. The buyer device 210 includes a processor 220 coupled to: a communication port 240; an input device 242; a display 244; and a printer 246. The processor 220 is also coupled to a memory 230 and may execute instructions to perform at least one embodiment of the present invention. A buyer uses the buyer device 210 to communicate with the purchasing system device 310 through, for example, the Internet.

The printer 246 shown in FIG. 4 is optional. If the buyer device 210 does not have the printer 246 attached, the buyer may write down a redemption code or store it in the buyer device 210 or another device, such as a portable buyer device. For example, the buyer may write down a redemption code and input it using a kiosk at the retailer. The kiosk may communicate with the purchasing system device 310, such as through an Internet connection, and retrieve the buyer's record (e.g., from the accepted offer database 1400) based on the redemption code. The kiosk could then print a voucher for the buyer, if desired.

According to another embodiment of the present invention, the buyer can take possession of the product without using a printed voucher. For example, the buyer may simply tell the POS terminal operator the redemption code. The operator inputs the redemption code using the POS terminal and the process continues as if the buyer had used a printed voucher. Also, if the buyer stores the redemption code in a portable buyer device (e.g., a PDA), the buyer may communicate the redemption code directly from the buyer device to the POS terminal, such as by using an Infra-Red (IR) communication link.

Retailer Device

Figure 5:
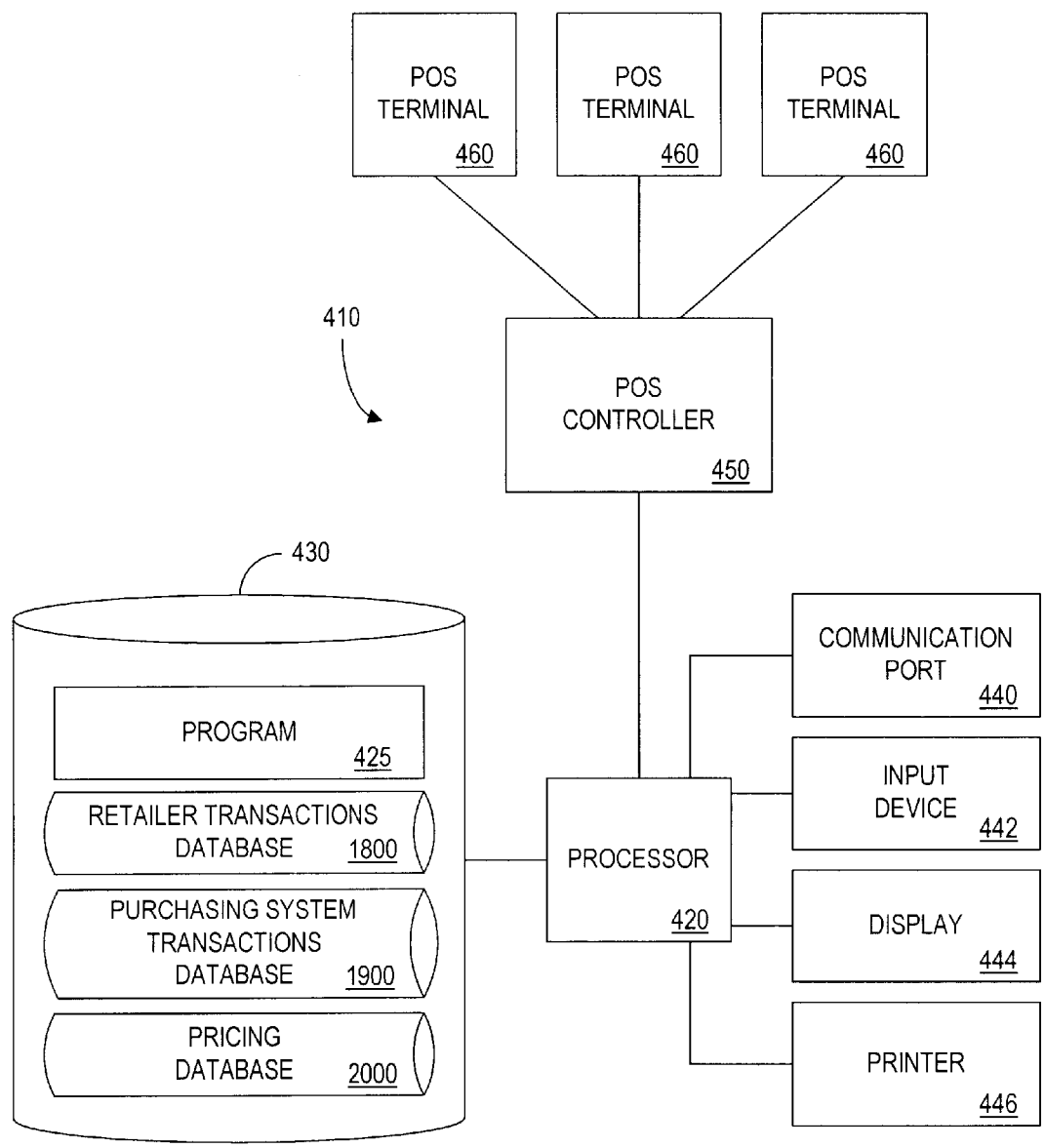
FIG. 5 is a block schematic diagram of a retailer device according to an embodiment of the present invention.

FIG. 5 is a block schematic diagram of a retailer device 410 according to an embodiment of the present invention. The retailer 410 includes a processor 420 coupled to: a communication port 440; an input device 442; a display 444; and a printer 446. The processor 420 is also coupled to a storage device 430 that stores a program 425 containing instructions adapted to be executed by the processor 420 to perform at least one embodiment of the present invention.

As shown in FIG. 5, the storage device 330 also contains a retailer transactions database 1800 (described in detail with respect to FIG. 18); a purchasing system transactions database 1900 (described in detail with respect to FIG. 19); and a pricing database 2000 (described in detail with respect to FIG. 20).

The processor 420 of the retailer device 410 is shown as being in "communication" with (or linked to) a POS controller 450 coupled to a number of POS terminals 460. Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time. In another embodiment, the retailer device 410 may be the POS controller, in which case the processor 420 can be directly linked to the POS terminals 460.

The retailer transactions database 1800 stores retailer transactions occurring at the retailer. A retailer transaction that involves a number of different products—including one purchasing system product redemption—may indicate that fact, for example, next to that product. According to another embodiment, if a buyer is taking possession of a product using a voucher, that product may be stored as a transaction record separate from the buyer's other purchases.

Each time the retailer processes a retail transaction that includes a redemption code, a new record is created in the purchasing system transactions database 1900. The retailer can use this record to track the products provided to buyers and to track the payments received from the purchasing system.

The pricing database 2000 may include, for example, the products the retailer carries, the retail price for those products, and the settlement price for each product. The settlement price may be used, for example, to determine the amount of money the retailer expects from the purchasing system for an honored voucher. If the retailer is the seller that accepted the buyer's offer, the settlement price may not be needed.

In addition, a retailer that participates in the purchasing system as both a seller and a product provider will need to determine, when a given product is being redeemed, whether or not the retailer is acting as the seller. This may be done using a database or by communicating with the purchasing system. For example, a retailer may both (i) sell a particular television through a purchasing system; and (ii) let buyers, who purchased the television through the purchasing system from a different seller, take possession of the television at the store. In this case, when a buyer visits the retailer to redeem a voucher, it must be determined whether the retailer should receive from the purchasing system (i) the buyer price (if the retailer, acting as a seller, sold the television to the buyer through the purchasing system); or (ii) the settlement price (if the retailer is merely letting the buyer take possession of the television at the retail store).

Product Category, Class and Feature Databases

Figure 7:
FIG. 7 is a tabular representation of a portion of a product class database according to an embodiment of the present invention.
Figure 8:
FIG. 8 is a tabular representation of a portion of a product feature database according to an embodiment of the present invention.

As will now be described, FIGS. 6 to 8 illustrate tables that can be used to help determine the type of product a buyer is trying to purchase through the purchasing system, such as when the buyer is submitting a buyer offer. Referring to FIG. 6, a table 600 represents an embodiment of the product category database 600 that may be stored at a purchasing system device 310 (FIGS. 2A and 2B). The table 600 includes entries defining a category of product that may be purchased. The data of an entry may generally be input, for example, to the purchasing system before the buyer submits an offer. The table 600 also defines fields 610, 620 for each of the entries. The fields specify: a category code 610 that uniquely identifies a product area (such as "TV" or "VC"); and a corresponding category description 620 (such as "television" or "video camera," respectively). Those skilled in the art will understand that the table 600, as well as the other tables discussed herein, may include any number of entries and fields.

When a new product category is to be offered to buyers, the purchasing system device 310 stores a unique category code 610, along with an associated category description 620 describing the category. Once the information is stored, it may be retrieved as needed by the purchasing system device 310, such as to display a list of product categories to a potential buyer.

Referring to FIG. 7, a table 700 represents an embodiment of the product class database 700 that may be stored at a purchasing system device 310 (FIGS. 2A and 2B). The table 700 includes entries for each category of product that may be purchased. The data of an entry may generally be input, for example, to the purchasing system before the buyer submits an offer. The table 700 also defines fields 710, 720, 730, 740 for each of the entries. The fields specify: a product category 710 (corresponding to a unique product category code 610); and a number of product classes 720, 730, 740 such as classes based on the product's manufacturer.

Note that all product categories 710 may not have the same number of classes (e.g., there is no class 3 for the WM category shown in FIG. 7). In other embodiments, the product categories 710 may be divided into classes based on other factors. These factors might include, for example: product features (e.g., class 1 televisions include a remote control, picture-in-picture, surround sound, and Digital Video Disc (DVD) capability; class 2 televisions include all class 1 features except DVD capability; and class 3 televisions include all class 2 features except surround sound and picture-in-picture); or retail price ranges (e.g., televisions with retail prices above $800 are in class 1, televisions with retail prices $500 and $800 are in class 2, and televisions with retail prices below $500 are in class 3). According to one embodiment of the present invention, a buyer is presented with the appropriate classes (as well as a description of the differences between the classes and examples of products within each class) when a product category is selected. The buyer can then select the product class or classes to be associated with the buyer offer.

When a new class or category of product is to be offered to buyers, the purchasing system device 310 stores a new entry or field describing the class of products. Once such information is stored, it may be retrieved as needed by the purchasing system device 310, such as to display a list of product classes to a potential buyer or to determine if a product meets the requirements of a buyer offer.

Referring to FIG. 8, a table 800 represents an embodiment of the product feature database 800 that may be stored at a purchasing system device 310 (FIGS. 2A and 2B). The table 800 includes entries for each category of product available for purchase. The data of an entry may generally be input, for example, to the purchasing system before the buyer submits an offer. The table 800 also defines fields 810, 820, 830 for each of the entries. The fields specify: a product category 810 (again corresponding to a unique product category code 610); one or more feature codes 820 per entry that uniquely identify available features (such as "RM" or "SS"); and one or more corresponding feature descriptions 830 (such as "remote control" or "surround sound"). Note that a class may have no applicable features and that some features may only be available in some classes.

When a new category or product feature is to be offered to buyers, the purchasing system device 310 stores information about the new features available in the category. Once such information is stored, it may be retrieved as needed by the purchasing system device 310, such as to display a list of available product features to a buyer. The features available within a category may be retrieved from this database and displayed to the buyer when a product category and/or class is selected. The buyer can then specify which features the product must (or should) include when the offer is submitted.

Product Database

FIGS. 9A to 9D are tabular representations of portions of product databases 900 that may be stored at the purchasing system device 310 according to local database embodiments of the present invention. In these embodiments, the purchasing system device 310 uses information in the local product database 900 to determine if a buyer offer will be accepted and/or which products will be used to fulfill the buyer offer. On the other hand, note that a product database 900 is not needed in the routing embodiment, where a buyer offer is routed to one or more sellers.

Figure 9A:

Referring to FIG. 9A, a table 910 represents one such embodiment of the product database 900 that may be stored at a purchasing system device 310 (FIGS. 2A and 2B). According to this embodiment, the purchasing system device 310 determines whether to accept a buyer's offer based on a seller's minimum price and settlement prices for the product. The table 910 includes entries for each product that may be purchased. The table 910 also defines fields 911, 912, 913, 914, 915, 916, 917 for each of the entries. The fields specify: a product identifier 911; a product category 912; a product class 913; product features 914; a seller identifier 915; a minimum (acceptable) price 916; and a retailer identifier 917.

The list of retailer identifiers 917, which may be provided by the seller, represents the retail stores at which a product is usually available. The purchasing system can also generate this list by asking a retail store which products are usually available at that store. The list could also be based on, for example, the category of product (e.g., televisions should be available at a consumer electronics superstore) or historical inventory patterns and trends of known retailers.

FIG. 9B is a table 920 that represents another embodiment of the product database 900. In this embodiment, the seller further specifies a region where a given product is available, and the quantity of the product that is available for sale, through the purchasing system. As shown in FIG. 9B, the table 920 includes the following fields: a product identifier 921; a product description 922; a product class 923; a product category 924; a seller identifier 925; a minimum price 926; an available quantity 927; a region 928; and a retailer identifier 929.

In this case, the seller provides one or more geographical regions 928 where a product will be available through the purchasing system device 310. For example, a seller may offer a limited number of a particular type of television at a reduced price in Connecticut because sales have been lower than expected in that area—but fine in the rest of the country. Similarly, a national retailer may want to offer a product for sale at a reduced price in all Florida stores. This function may also be performed using ZIP codes (or any other indication of geographical area) and/or, for example, a known Geographic Information Systems (GIS) software application such as the GeoMedia Web Map application available from Intergraph Corporation, Huntsville, Ala.

Another embodiment of the present invention is illustrated in FIG. 9C, showing a table 930. According to this embodiment, a buyer offer is routed to an appropriate seller (based on, for example, a product category). In this case, therefore, the product database 930 may be stored at the seller device 510 and no seller identifier field is necessary. As shown in FIG. 9C, the table 930 includes the following fields: a product identifier 931; a product description 932; a product category 933; product features 934; and a minimum price 935 (i.e., the seller's minimum acceptable price).

Referring to FIG. 9D, a table 940 represents another embodiment wherein the seller provides a maximum subsidy, and not a minimum price, to the purchasing system device 310 for a given product. As shown in FIG. 9D, the table 940 includes the following fields: a product identifier 941; a product category 942; a product class 943; product features 934; a seller identifier 945; a maximum subsidy amount 946; and a retailer identifier 947.

Figure 9E:
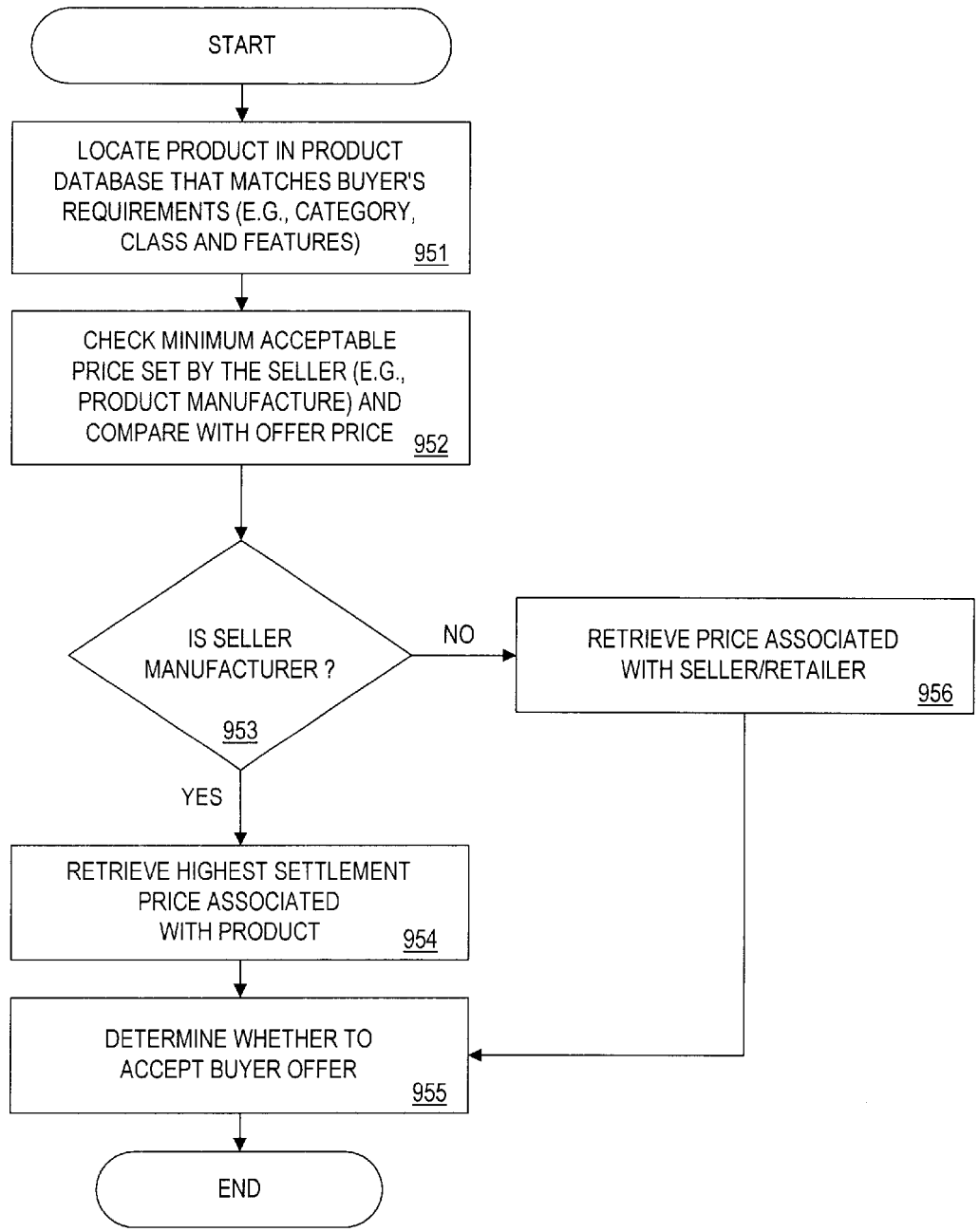
FIG. 9E illustrates a method of how a purchasing system device may use a product database according to an embodiment of the present invention.

FIG. 9E illustrates a method of how the purchasing system device may use the product database 900 according to an embodiment of the present invention. When a buyer offer is to be evaluated, a product in the product database 900 is located that matches the requirements of the buyer offer (such as the product category, class and features) at 951. Of course, if no such product can be found then the buyer offer will not be accepted.

At 952 the buyer's offer price is compared with any minimum price set by the seller. In the event the buyer's offer price is too low, that product will not be used to accept the offer and the process is repeated with respect to other products. If the offer price is not below any minimum price set by a seller (such as a manufacturer), the purchasing system determines if the seller is a retailer or a manufacturer at 953 (such as be querying the seller database 1000).

If it is determined that the seller is a manufacturer, the purchasing system determines the settlement prices associated with the product at various retailers at 954. This may be done, for example, by comparing settlement prices stored in the settlement price database 1500 with respect to various retailers (described with respect to FIG. 15). The purchasing system may, for example, locate the highest possible settlement price it would have to pay (i.e., the highest amount that a retail store may demand in return for honoring a voucher for that product) or an average settlement price looking at all retailers. The highest settlement price (i.e., the largest amount that will need to be provided to a retailer) can be used, for example, to select between two products that could fulfill a buyer offer, or even to reject a buyer offer. According to another embodiment, the average of a number of different settlement prices can be used for this purpose. If the seller is a retailer at 953, the purchasing system may only need to determine the price associated with that retailer at 956.

These steps may be repeated if more than one qualified product is available such that the offer price is not below the minimum price, if any, set by a seller. The purchasing system device 310 can then determine whether or not the buyer offer will be accepted at 954. For example, after any subsidy information is considered, does the purchasing system want to accept the buyer offer using any of the products (e.g., if the buyer's offer is accepted will the purchasing system make enough profit or not lose too much money)? That is, the pricing system device 310 may select the product and/or one or more retailers to be used to fulfill the buyer offer. The conditions used in this determination may be dynamic and can be based on prior sales made through the purchasing system.

Seller Database

FIG. 10A is a tabular representation of a portion of a seller database 1000 that may be stored at the purchasing system device 310 according to an embodiment of the present invention. The purchasing system device 310 may use the seller database 1000 to determine the seller type (i.e. whether the seller is a manufacturer or a retailer) and other information pertaining to a seller (such as the seller address for offer routing purposes or billing). As shown in FIG. 10A, the seller database 1000 may include: a seller identifier 1010; a seller name 1020; a seller type 1030; a seller address 1040; and seller categories 1050. In the routing embodiment, the seller database may contain contact information (e.g., a URL, an e-mail address, or a file path) used to route an offer, as well as product categories typically sold by the seller (used in selecting sellers to receive a buyer offer).

Figure 10B:
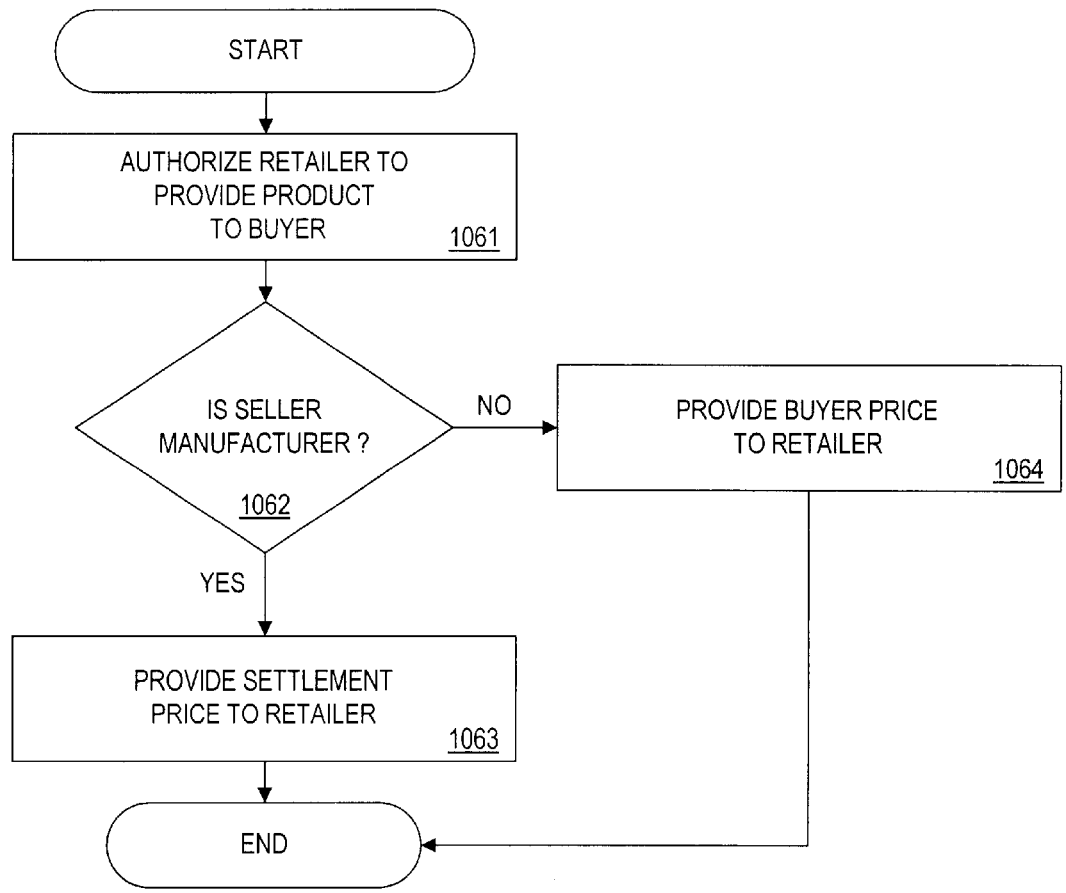
FIG. 10B illustrates a method of how a purchasing system device may use a seller database according to an embodiment of the present invention.

As explained with respect to FIG. 9, the seller database 1000 may be used, for example, to determine whether a number of settlement prices (in the case of a manufacturer seller) or a single price (associated with a retailer seller) should be used when determining whether or not a buyer offer will be accepted. FIG. 10B illustrates another use of the seller database 1000 according to an embodiment of the present invention. When the purchasing system authorizes a retailer to provide a product to a buyer at 1061, it is determined whether or not the seller is a manufacturer at 1062 (such as by using the seller type 1030). In the case of a manufacturer seller, the settlement price is provided to the retailer at 1063. On the other hand, when the retailer also acted as the seller, the buyer price may simply be provided to the retailer. Although not shown in FIG. 10B, if the seller was a retailer—but not the same retailer at which the buyer took possession of the product—the settlement price would still be provided to the retailer at which the took possession of the product.

Retailer Database

FIG. 11 is a tabular representation of a portion of a retailer database 1100 that may be stored at the purchasing system device 310 according to an embodiment of the present invention. The retailer database 1100 may be used by the purchasing system device 310 to retrieve information about a retailer, such as the product categories that the retailer typically carries and the retailer location. As shown in FIG. 11, the retailer database 1100 may include: a retailer identifier 1110; a retailer name 1120; a retailer location 1130; and product categories honored or sold by the retailer 1140.

In particular, the retailer database 1100 may store identifiers and contact information of retailers and the products for which vouchers will be accepted at those retailers. The purchasing system device 310 can use this database to select one or more retailers where a voucher will be redeemable, and to retrieve the contact information for the retailers (e.g., the retailer name 1120 and the retailer location 1130) to be printed on the voucher. The information may be also used to determine if a retailer is close enough to a buyer to be included on the voucher, using algorithms which are well known in the art.

Offer Database

FIGS. 12A and 12B are tabular representations of portions of an offer database 1200 that may be stored at the purchasing system device 310 according to an embodiment of the present invention. The offer database stores information regarding each buyer's offer processed by the purchasing system device 310. In particular, the portion of the offer database 1210 shown in FIG. 12A may include: an offer identifier 1211 (which is the voucher identifier in one embodiment, if the offer is accepted); a buyer e-mail address 1212; an offer price 1213; a selected product category 1214; a selected product class 1215; selected product features 1216; and an offer status 1217 (e.g., pending, not accepted, accepted, redeemed).

The portion of the offer database 1220 shown in FIG. 12B may include: an indication whether or not a secondary offer has been made 1221; a secondary offer price 1222; a secondary offer status 1223; and a payment identifier 1224. According to an embodiment of the present invention, the buyer may specify acceptable substitute products when submitting the original offer. In effect, the buyer submits a primary offer (for the preferred product) and a "secondary" offer (for a substitute product). For example, a buyer submitting an offer for a camera may specify (i) essential and (ii) preferable features. A camera with both the essential and preferable features is the primary offer and a camera with just the essential features is the secondary offer. The buyer may also submit separate prices for the primary and secondary offers. The buyer may or may not agree to be automatically bound by the secondary offer. A detailed description of a system and method for enabling a buyer to rank submitted offers in order of preference can be found in U.S. patent application Ser. No. 08/889,319, filed on Jul. 8, 1997 and entitled "Buyer Offer Management System."

Supplemental Offer Database

FIG. 13 is a tabular representation of a portion of a supplemental offer database 1300 that may be stored at the purchasing system device 310 according to an embodiment of the present invention. The supplemental offer database 1300 may be used, for example, to determine what supplemental offer to include on a buyer's voucher. As shown in FIG. 13, the supplemental offer database 1300 may include a supplemental offer identifier 1310; a supplemental offer description 1320; and a retailer identifier 1330. The purchasing system device 310 can select a supplemental offer from this database once a buyer offer is accepted by a seller. According to one embodiment, the supplemental offer is selected based on the retailer. Thus, if the voucher is redeemable at several retailers, the purchasing system device 310 may select and include different supplemental offers for each retailer.

Of course, supplemental offers may be selected based on other factors, such as the product manufacturer, the product, the buyer and the price of the product.

Accepted Offer Database

FIG. 14 is a tabular representation of a record of an accepted offer database 1400 that may be stored at the purchasing system device 310 according to an embodiment of the present invention. As shown in FIG. 14, the accepted offer database 1400 may include: a transaction identifier 1402; an offer identifier 1404 (which may, if desired, also serve as the transaction identifier 1402); a redemption code 1406; a payment identifier 1408; an initial payment amount 1410; a final payment amount 1412; a payment status 1414; a seller identifier 1416; and a product identifier 1418.

When a buyer offer is accepted by a seller, or fulfilled by the purchasing system, the purchasing system device 310 may communicate the acceptance to the appropriate buyer device 210 and store the details of the accepted offer, including information from the offer database 1200, in the accepted offer database 1400.

The purchasing system device 310 may then collect payment from the buyer, such as by using the payment identifier 1408. For example, a hold may be immediately placed on the buyer's funds (e.g., credit line of the credit card account) for the offer price, and the buyer's account may not be actually charged until the buyer takes possession of the product. The purchasing system device 310 may instead charge the buyer's account when the offer is accepted, if desired.

It should be noted that the amount of funds charged or put on hold (i.e., "frozen") may be greater than the offer price. For example, an expected sales tax, such as a tax based on the buyer's home address, may be added to the offer price. In addition, the amount of frozen funds may be greater than offer price to account for unforeseen circumstances that may subsequently occur. For example, a penalty may be imposed on the buyer if the buyer does not take possession of the product by a certain date.

As a result, if the purchasing system device 310 charges the buyer's account when the offer is accepted, the amount charge may not be correct based on the actual redemption conditions of the transaction at the retailer. For example, the retailer may determine that the buyer has waited too long to take possession of the product. In this case, the purchasing system device 310 may debit the buyer's account to correct the amount. Similarly, the retail price of the product at the retailer may be lower than the buyer price (e.g., the retailer has unexpectedly placed the product on sale). In this case, the purchasing system device 310 may credit the buyer's account.

According to an embodiment of the present invention, collecting payment (based on the actual redemption conditions) may comprise charging the offer price to the payment identifier (e.g., credit card account) provided with the buyer offer. According to another embodiment, when the purchasing system device 310 receives an indication that the buyer has redeemed the product, the appropriate amount is charged to a financial account provided by the buyer at the retailer.

Note that when a buyer goes to a retailer to redeem a voucher, it is possible that he or she will find that the retailer's in-store price is less than the price arranged with the pricing system (e.g., the item may be on sale). In this case, the pricing system can guarantee, if desired, the buyer that he or she will be charged the lower of the two prices. Thus, the purchasing system device 310 may compare the product's retail price at the time of redemption with the buyer price, and make sure that the buyer's financial account is only charged the lower of the two prices. In the case where the buyer was charged for the product at the time the sale was arranged with the purchasing system, the purchasing system may credit the difference back to the buyer's account.

Additionally, the purchasing system device 310 may distribute payment, such as by using an Electronic Fund Transfer (EFT) transaction, to the retailer that provided the product to the buyer once the purchasing system receives an indication that the buyer has taken possession of the product at that retailer. If the buyer offer was accepted by a manufacturer (and not a retailer), the purchasing system device 310 can also collect any payment necessary (e.g., a subsidy from the manufacturer). For example, this may be the case when the amount paid to the retailer by the purchasing system exceeds the accepted offer price and collected from the buyer.

The purchasing system device 310 might also collect an additional payment from the seller as a "commission fee" for handling the offer. Such a commission fee could, of course, comprise a fixed percentage of the accepted price and/or a flat fee.

The accepted offer database 1400 may also include: a retailer identifier 1420; a redemption status 1430; a supplemental offer identifier 1440; and a supplemental offer status 1450.

The purchasing system device 310, which may have handled a buyer offer, may also track the fulfillment, acceptance, and redemption of buyer offers. According to one embodiment of the present invention, the purchasing system device 310 collects and disburses payment for each product sold through the system as appropriate. For example, the purchasing system device 310 may: (i) collect payment from a buyer when the buyer's offer is fulfilled by a seller; (ii) disburse payment for the product to the retailer at which the offer is redeemed; and (iii) collect a commission fee from the seller that accepted the buyer's offer.

Because a particular voucher may be redeemable at several retailers, the disbursement of payment may be finalized once the buyer takes possession of the product at a local retailer. That is, when the purchasing system device 310 determines that the buyer has taken possession of the product (e.g., a retailer notifies the purchasing system device 310, either in substantially real time or periodically, of the vouchers that have been redeemed in their stores), it finalizes the collection and disbursement of funds between the appropriate parties and updates the redemption status 1430 as appropriate (e.g., to "redeemed" for the retailer identifier 1420 associated with the store that provided the product to the buyer and to "invalid" for all other retailer identifiers 1420).

According to another embodiment of the present invention, the redemption status 1430 further reflects that a voucher is associated with a number of different products (e.g., the redemption status 1430 may be "redeemed" for a television and "pending" for a VCR). In another embodiment, a voucher may be redeemable for one of several products (not shown in FIG. 14), depending on the retailer at which the buyer takes possession of the product.

Settlement Price Database

FIG. 15 is a tabular representation of a portion of a settlement price database 1500 that may be stored at the purchasing system device 310 according to an embodiment of the present invention. The settlement price database 1500 stores the settlement price expected by each retailer for each product sold through the purchasing system device 310. As shown in FIG. 15, the settlement price database 1500 may include a product identifier 1510 together with a number of retailer identifiers 1520, 1522, 1524 and associated settlement prices 1530, 1532, 1534. The settlement price database 1500 may be used, for example, to determine the lowest settlement price associated with a product as described with respect to FIG. 9E.

According to another embodiment of the present invention, the purchasing system device 310 uses this database to determine how much it owes a retailer at which a purchasing system voucher was redeemed. In other embodiments, this database may be used by the purchasing system device 310 to select retailers. For example, if a buyer offer price of $175 was accepted by the manufacturer and retailer A has an agreement to receive $200 for the offered product, while retailer B has an agreement to receive $210, the purchasing system device 310 may determine that the voucher is only redeemable at retailer A to minimize the loss to the manufacturer and possibly to boost revenue earned by the purchasing system for its role as a transaction facilitator.

Note that in addition to an arrangement between the retailer and the purchasing system to specify, for example, a product and the settlement price, the retailer may also have an arrangement directly with a product manufacturer. An arrangement between a retailer and a manufacturer may specify an additional subsidy amount that the manufacturer will provide to the retailer for one or more of the manufacturer's products, which could result in the retailer agreeing to accept a lower settlement price from the purchasing system.

By way of example, consider a retailer that typically sells a particular manufacturer and model television for a retail price of $200. The retailer can enter into an agreement with the purchasing system to honor vouchers for that television in exchange for a settlement price of $180. The retailer might agree to accept $180 to increase sales, or potential sales, from buyers sent to store by the purchasing system.

The retailer may also make an agreement with the television manufacturer to receive $10 for each television provided to a buyer when a voucher is redeemed. The manufacturer may, for example, provide such a subsidy to encourage the retailer to agree to a lower settlement price with the purchasing system—increasing the likelihood that the television will be sold through the purchasing system device 310. Note that the settlement price does not need to be less than the retail price, and the manufacturer could provide a subsidy directly to the purchasing system instead of, or in addition to, the retailer.

Seller Product Database

FIG. 16 is a tabular representation of a portion of a seller product database 1600 that may be stored at a seller device 510 according to the routing embodiment of the present invention. The seller product database 1600 may be used by the seller to determine whether or not a buyer offer will be accepted. As shown in FIG. 16, the seller product database 1600 may include: a product identifier 1610; a product category 1620; product features 1630; and a minimum price 1640.

Collected Demand Database

Figure 17:
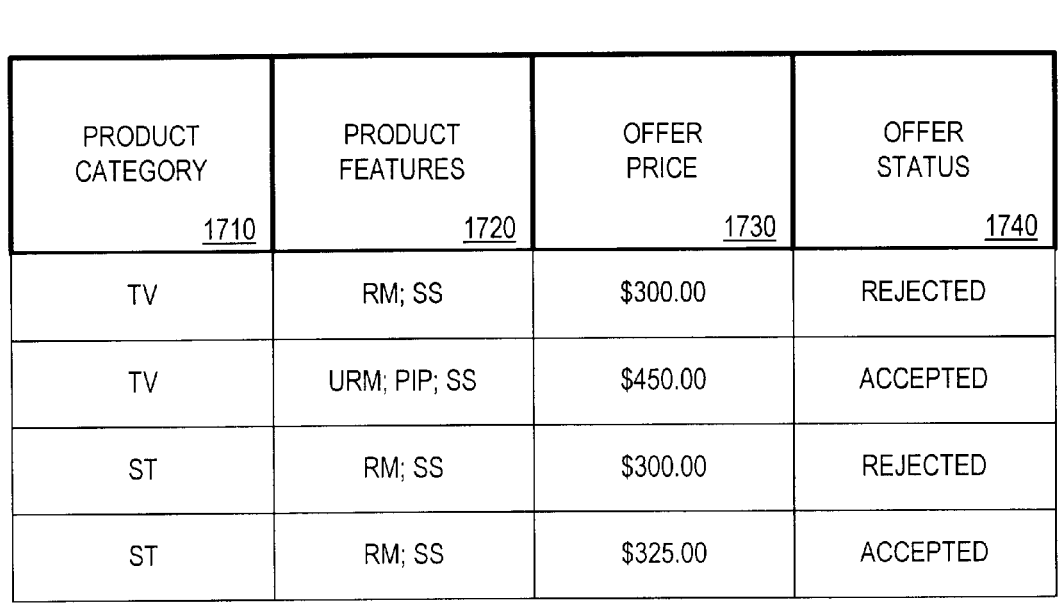
FIG. 17 is a tabular representation of a portion of a collected demand database according to an embodiment of the present invention.

FIG. 17 is a tabular representation of a portion of a collected demand database 1700 that may be stored at the seller device 510 according to the routing embodiment of the present invention. The collected demand database 1700 may be used to record the demand for various products, and whether or not offers for the products were accepted or rejected by the purchasing system device 310. As shown in FIG. 17, the collected demand database 1700 may include: a product category 1710; product features; an offer price 1730; and an offer status 1740.

The collected demand database 1700 may be used by the purchasing system device 310 to run reports for sellers (e.g., manufacturers). The collected demand database 1700 may also be used to determine if certain products should be added to the system or if certain minimum acceptable prices should be lowered. According to another embodiment, a collected demand database 1700 may instead be stored at one or more seller devices 510.

The seller or purchasing system (if the minimum price is set by the purchasing system) may adjust (e.g., lower) the minimum selling price if there is a huge demand that cannot be met because minimum selling price is to high (e.g., buyer named prices are typically lower than the minimum selling price). Similarly, the minimum selling price may also be increased if buyers typically name prices that are higher than the minimum price.

Retailer Transactions Database

FIG. 18 is a tabular representation of a portion of a record of the retailer transactions database 1800 that may be stored at a retailer device 410 according to an embodiment of the present invention. The retailer transaction database 1800 may store information about each transaction processed by the retailer. As shown in FIG. 18, the retailer transactions database 1800 may include: a retailer offer identifier 1802; a time 1804 at which the transaction occurred; a POS terminal 1806; an operator identifier 1808; a total 1810; and a payment type 1812. The retailer transactions database 1800 may also include a product identifier 1820 and a product price 1830. According to one embodiment of the present invention, the product price 1830 simply points to a record of the purchasing system transaction database 1900, instead of showing the retail price (e.g., the "0–1 P" product price shown in FIG. 18).

Note that the transaction illustrated in the record shown in FIG. 18 includes a product ("P304-44") for which a purchasing system voucher was presented. Such a purchasing system transactions can be flagged, if desired, for easy reporting. For example, if each transaction has a unique identifier a purchasing system transaction may begin with a special number (e.g., 99-). Note that transactions involving the redemption of vouchers may be performed separately from normal retail transactions, if desired.

Purchasing System Transactions Database

FIG. 19 is a tabular representation of a portion of a purchasing system transactions database 1900 that may be stored at the retailer device 410 according to an embodiment of the present invention. The purchasing system transactions database 1900 may store information regarding each purchasing system voucher processed by the retailer. As shown in FIG. 19, the purchasing system transactions database 1900 may include: a retail transaction identifier 1910; a redemption code 1920; a product identifier 1930; a payment expected 1940 (e.g., the settlement price associated with the product); and a payment status 1950, such as "pending" or "received." Recall that the payment 1940 expected may depend on whether the retailer is acting as the seller in addition to acting as the store where the buyer is taking possession of the product.

Pricing Database

FIG. 20 is a tabular representation of a portion of a pricing database 2000 that may be stored at the retailer device 410 according to an embodiment of the present invention. The pricing database 2000 may contain the retailer's retail price 2020 for each product carried (as shown by a product identifier 2010) along with a settlement price 2030 for the product. The pricing database 2000 may be used by the retailer, for example, to determine the price to be charged to a typical buyer (i.e., the retail price 2020) and the price to be expected from the purchasing system in exchange for providing the product to a buyer when redeeming a voucher (i.e., the settlement price) 2030. Which of the values will be used may also depend on whether the retailer is acting as the seller in addition to acting as the store where the buyer is taking possession of the product.

Pseudo Credit Card Account Numbers as Redemption Codes

FIGS. 21A to 21D are tabular representations of portions of databases that may reside at the purchasing system device 310 and be used to issue, track and authorize the redemption of redemption codes in the format of a credit card account number, in accordance with one embodiment of the present invention. Note that a retailer may want to determine the validity of a voucher at the POS to prevent fraudulent use, such as over-redemption of a voucher, by unscrupulous buyers. For example, consider a buyer who establishes a $200 price with a manufacturer for a television. A hold is put on the buyer's credit card for $200, and a voucher for the television is issued to the buyer. The buyer prints out three copies of the voucher and redeems all three at various retailers, and each of the retailer settles with the purchasing system device 310 off-line or through a back channel at the end of the day. The purchasing system device 310 determines that it now owes the retailers an additional $400 (for the two additional, unauthorized transactions). However, the purchasing system device 310 may find that the additional $400 charge cannot be authorized because the buyer is over his or her credit limit. As will now be explained, an advantage of these embodiments of the present invention is that a retailer can verify a voucher at the POS when a customer is attempting to take possession of a product using a voucher (including a pseudo credit card account number) without special equipment. According to one embodiment, the retailer may communicate with the purchasing system 310 at the time of redemption over the existing banking network using a CAT that is typically connected to each POS at the retailer. Of course, the retailer may instead communicate directly with the purchasing system at the time of redemption through other networks, such as the Internet.

According to this embodiment of the present invention, the purchasing system device 310 acts as a one-time, or "pseudo," credit card account number issuer. That is, the redemption code may look like a credit card number (e.g., 1111-2222-3333-4444) to a POS device located at a retailer. As is known, a CAT device typically sends a credit card number to one of a number of credit card clearing houses for authorization, which in turn uses the first four digits of the credit card to route the authorization request. In this embodiment, the purchasing system may be assigned a unique four digit identifier (used as the first four digits of the pseudo credit card number redemption code) that can be recognized by credit card clearing houses. The buyer uses the issued pseudo credit card number to redeem his product at a retailer.

If each issued and outstanding pseudo credit card number redemption code is to be associated with a unique transaction, the purchasing system device 310 may keep track of available pseudo credit card numbers. For example, FIG. 21A is a tabular representation of a portion of an available redemption code database 2110 that may include a redemption code 2111 and a status 2112 (e.g., available or issued).

When a seller is found to fulfill the buyer offer, the purchasing system device 310 issues the buyer a 16-digit identifier, in the format of a pseudo credit card account number. The first four digits of the account number identify the purchasing system device 310 as the issuer. The account number is a one-time use "pseudo" account number, good only for the settlement price. In this embodiment, the voucher may include: (i) the issued redemption code in the format of a payment number; (ii) the product identifier and description; and (iii) the retailers at which the voucher is redeemable.

For example, FIG. 21B is a tabular representation of a portion of an issued redemption code database 2120 that may be stored at the purchasing system device 310. The issued redemption code database 2120 may include: a pseudo credit card number redemption code 2121; a status 2122 (redeemed/unredeemed); an offer identifier 2123; and a number of retailer identifiers 2124, 2125, 2126 indicating which retailers are associated with each redemption code. Note that a redemption code may be associated with either a single retailer or a number of retailers.

In addition, FIG. 21C is a tabular representation of a portion of a buyer payment database 2130 that may be stored at the purchasing system device 2130. The buyer payment database 2130 may include: an offer identifier 2131; a payment identifier 2132 (e.g., the buyer's real credit or debit card number, checking account number, or an electronic cash identifier); an authorized amount 2133; and a charged amount 2134. Note the amount authorized may be different from the amount that is actually charged to the buyer's financial account. This may occur whenever unforeseen transaction scenarios arise at the point of redemption necessitating an adjusted price, such as, for example: (i) a penalty imposed on the buyer for failing to take possession of the product within a predetermined time; or (ii) the buyer taking possession of the product in a state or city having a higher or lower sales tax.

For example, FIG. 21D illustrates a transaction database 2140 that may be stored at the purchasing system device 310 according to an embodiment of the present invention. The transaction database 2140 may include: an offer identifier 2141; a retailer identifier 2142; a product identifier 2143, such as a Universal Product Code (UPC) or a SKU identifier; a seller identifier 2144; an established price 2145; an initial additional charge 2146; a subsequent additional charge 2147; and a final price 2148. As can be seen in FIG. 21D, transaction "9032" involved an accepted offer price of $200.

The purchasing system device 310 initially assumed an additional charge of $16, based on the 8% sales tax in the buyer's home state. The buyer, however, took possession of the product in a different sate and the actual sales tax was only 6.5% (or $13). The final price charged to the buyer's financial account, therefore, was only $213. As is also shown in FIG. 21D, the final price 2148 may also be greater than the established price 2145 plus the initial additional charge 2146 (e.g., transaction "9034").

Vouchers

Figure 22:
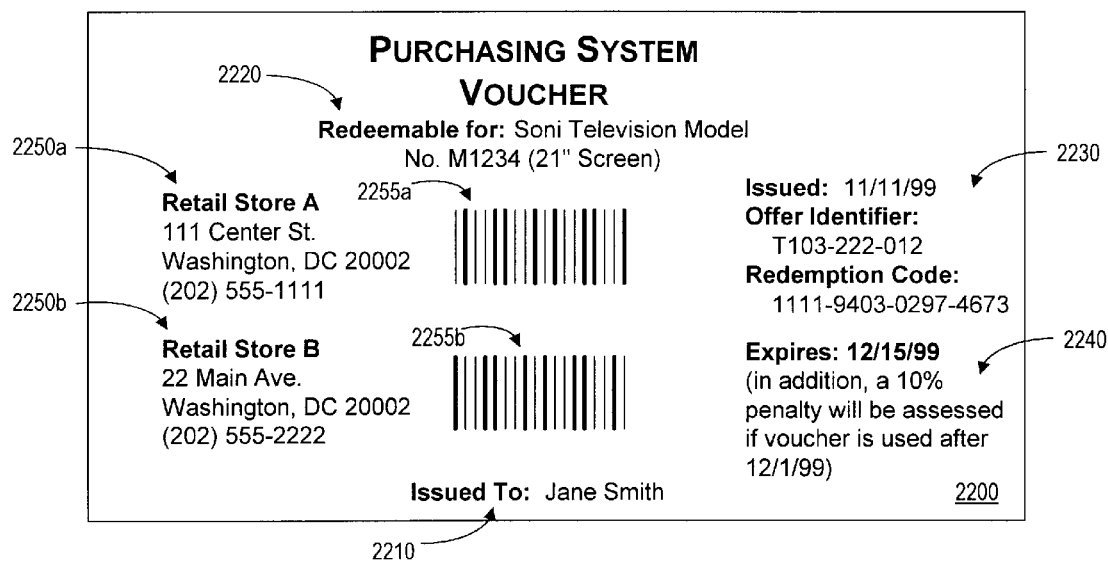
FIG. 22 illustrates a purchasing system voucher according to an embodiment of the present invention.

The purchasing system device 310 outputs redemption information, including supplemental offer information and information that the buyer needs to take possession of the product at a retailer. The information may be transmitted to the buyer in the form of an electronic message enabling the creation of a coupon-like voucher that may include a bar code. As shown in FIG. 22, which illustrates a purchasing system voucher 2200 according to an embodiment of the present invention, information about the purchase can also be printed on the voucher.

For example, the information printed on the purchasing system voucher 2200 can include: the name of the buyer 2210; a description of the product being purchased 2220 (perhaps with an identifier, such as a bar code, not shown in FIG. 22); and a field 2230 listing the issue date, offer identifier and redemption code associated with the voucher 2200; and expiration date and/or penalty information 2240. Note that a number of different products 2220 may be listed on a voucher. This may be necessary, for example, if multiple products are being purchased or if different retailers use different bar codes, model names, etc. for a single product.

The buyer may have the option of going to a number of different retailers listed on the voucher 200 to take possession of the product. For example, the voucher 2200 shown in FIG. 22 lists a number of different retailers 2250a, 2250b and associated retailer identifiers 2255a, 2255b. Of course, when the seller is a retailer the voucher 2200 might only be redeemable through that retailer (e.g., a specific retail store, a subset of retail stores in a national chain, or all retail stores in a national chain).

According to one embodiment of the present invention, the price being paid by the buyer is not included on the voucher 2200. Thus, if the accepting seller is a manufacturer, the retailer that provides the product to the buyer will not be aware of the price the manufacturer accepted for the product. The retailer is only aware of the settlement price paid by the purchasing system for honoring the voucher.

A bar code on the voucher (not shown in FIG. 22) may also include a product identifier. In such an embodiment, a cashier at the POS terminal can scan the voucher 2200 along with the product and, if the product identifier encoded into the bar code matches the scanned product identifier, have the transaction locally authorized. Alternatively, the bar code may serve as a pointer to a record in a database, either stored locally at the retailer or remotely at the purchasing system device 310. Using the bar code, the transaction may be authorized based on whether the data stored in a database matches the current transaction (i.e., the voucher is redeemable at that retailer for that product).

Instead of a printed voucher 2200, the redemption information may instead simply be a number or alphanumeric identifier provided to the buyer. In this case, the buyer could write the information down (such as when receiving the information over the telephone) and bring the number to the retailer when taking possession of the product.

According to another embodiment of the present invention, redemption information may be, for example, information encoded using, for example, cryptographic techniques. Applicable encryption techniques are described in "Applied Cryptography: Protocols, Algorithms, and Source Code in C," by Bruce Schneier. The information may also be stored electronically, such as in a smart-card type device, PDA or removable memory device. A single voucher 2200 may be redeemable at a number of different retailers 2250a, 2250b or separate vouchers can be printed for each retailer. In this case, when one voucher is redeemed other vouchers can be made invalid.

According to another embodiment of the present invention, the voucher also serves as a Record Of Charge (ROC). For example, the purchasing system may place a hold, or "freeze," on the buyer's credit card account when sending the redemption information to the buyer. As used here, a freeze is any pre-authorization of a charge that will be made to the buyer's account at a later time.

The buyer then prints out the voucher/ROC and brings it to a retailer. Once the retailer submits the ROC to the merchant bank, the buyer's account is charged and the purchasing system may receive payment for the transaction and provides payment to the retailer for allowing the buyer to take possession of a product. According to another embodiment, the ROC may indicate the retailer's merchant identifier as the entity to which the funds should be transferred.

Purchasing System Methods

Figure 23:
FIG. 23 is a flow chart illustrating a method in which a buyer takes possession of a product at a retailer according to an embodiment of the present invention.

FIG. 23 is a flow chart illustrating a method in which a buyer takes possession of a product at a retailer according to an embodiment of the present invention. The flow chart in FIG. 23, as well as the other flow charts discussed herein, are not meant to imply a fixed order to the steps; an embodiment of the present invention can be practiced in any order that is practicable. At 2302, the purchasing system establishes a first price for a product between a buyer and seller. The purchasing system arranges for the buyer to take possession of the product at a retailer that offers the product for sale at a second price 2204. At 2206, the purchasing system transmits verification information to the retailer, authorizing the retailer to allow the buyer to take possession of the product.

Figure 24:
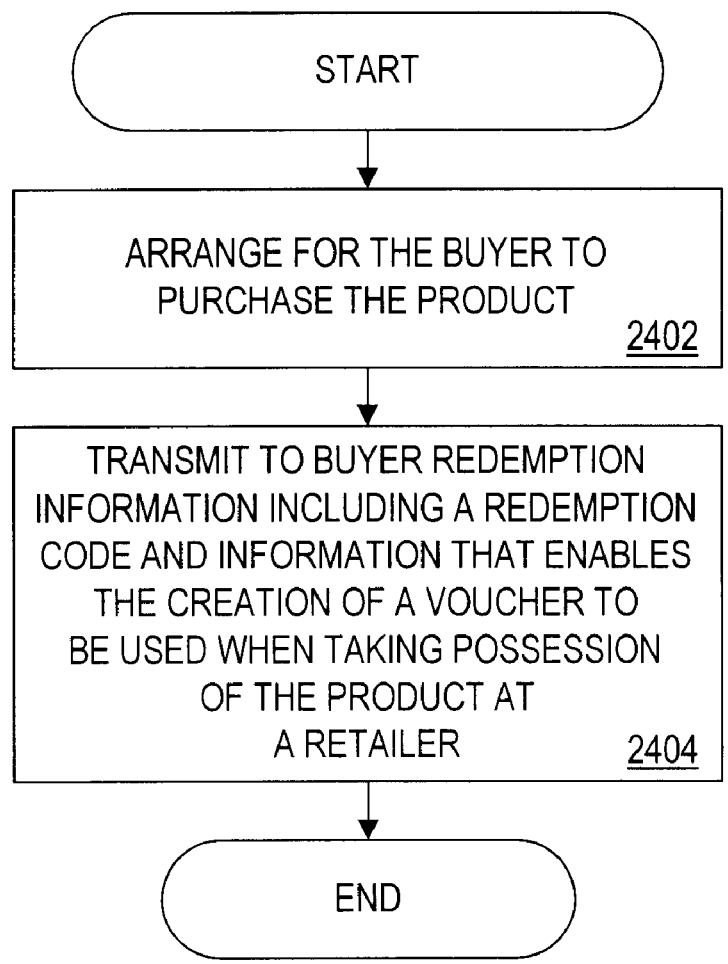
FIG. 24 is a flow chart illustrating a method in which a buyer takes possession of a product at a retailer according to another embodiment of the present invention.

FIG. 24 is a flow chart illustrating a method in which a buyer takes possession of a product at a retailer according to another embodiment of the present invention. At 2402, the purchasing system arranges for the buyer to purchase a product, such as by receiving and accepting a buyer offer. At this point, information about the purchase may be stored to be used later when the buyer takes possession of the product at a retailer. The purchasing system transmits redemption information to the buyer at 2404. The redemption information can include a redemption code and information that enables the creation of a voucher that lets the buyer take possession of the product at a retailer.

Figure 25:
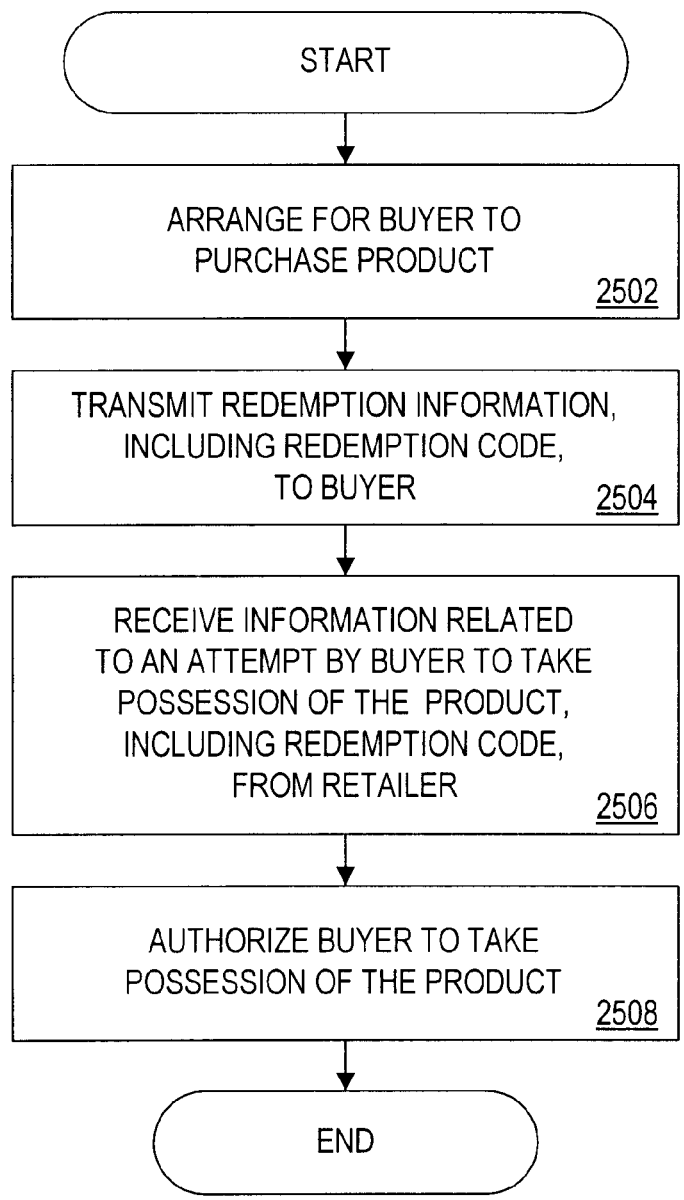
FIG. 25 is a flow chart illustrating a method in which a buyer takes possession of a product at a retailer according to another embodiment of the present invention.

FIG. 25 is a flow chart illustrating a method in which a buyer takes possession of a product at a retailer according to another embodiment of the present invention. At 2502 the purchasing system arranges for the buyer to purchase a product. Redemption information, including a redemption code, is transmitted at 2504. At 2506, the purchasing system receives information related to an attempt to take possession of the product, including the redemption code, from a retailer. The purchasing system authorizes the buyer to take possession of the product at 2508.

Figure 26A:
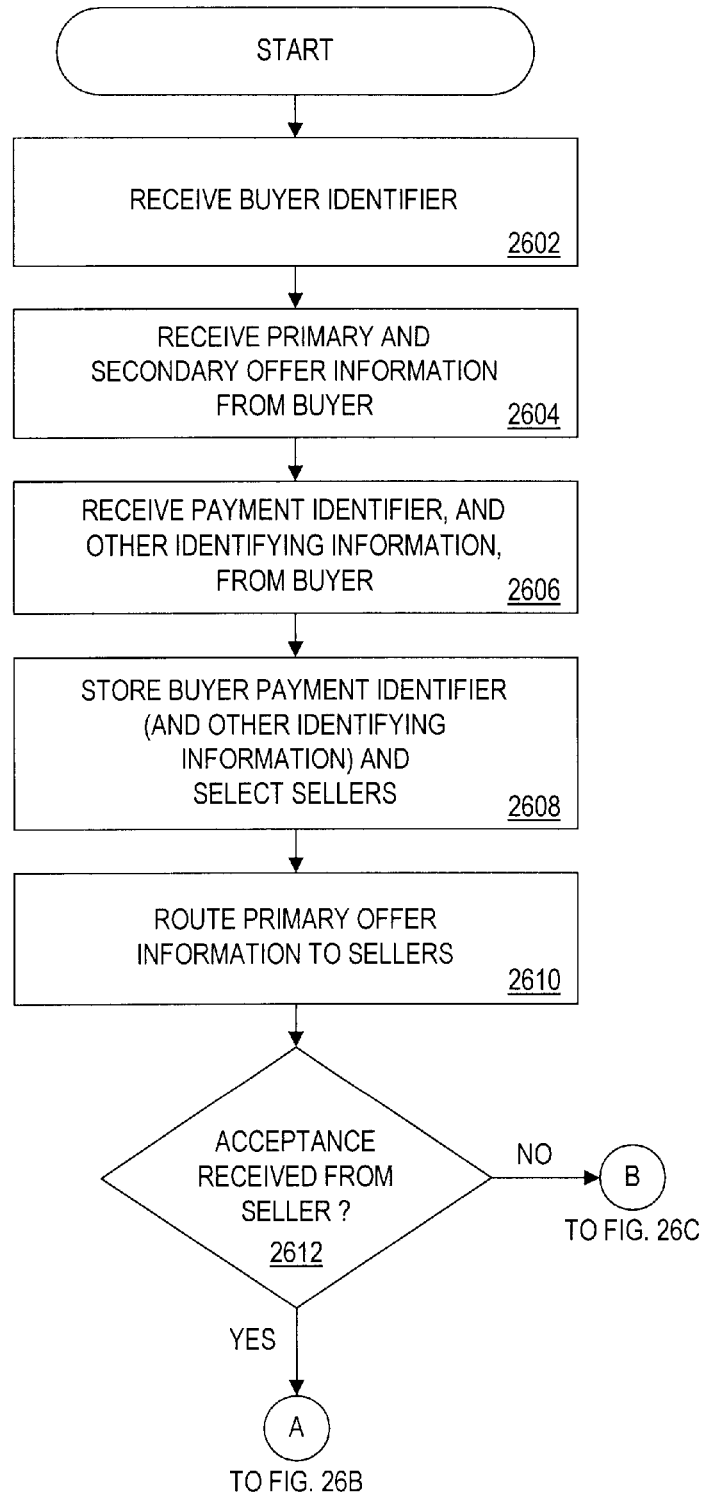
FIGS. 26A to 26C are flow charts illustrating a method in which a buyer takes possession of a product at a retailer according to another embodiment of the present invention.
Figure 26B:
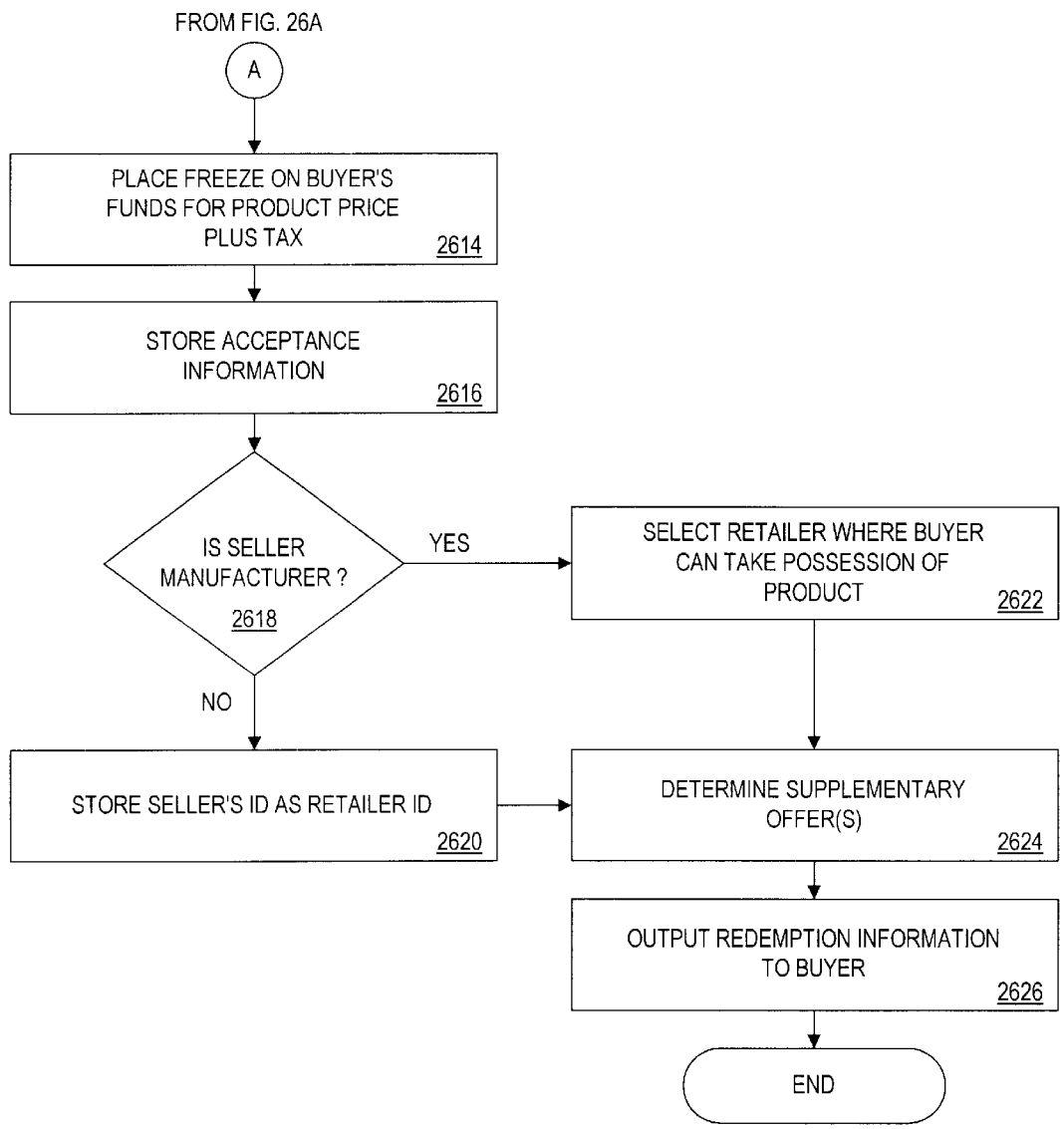
Figure 26C:
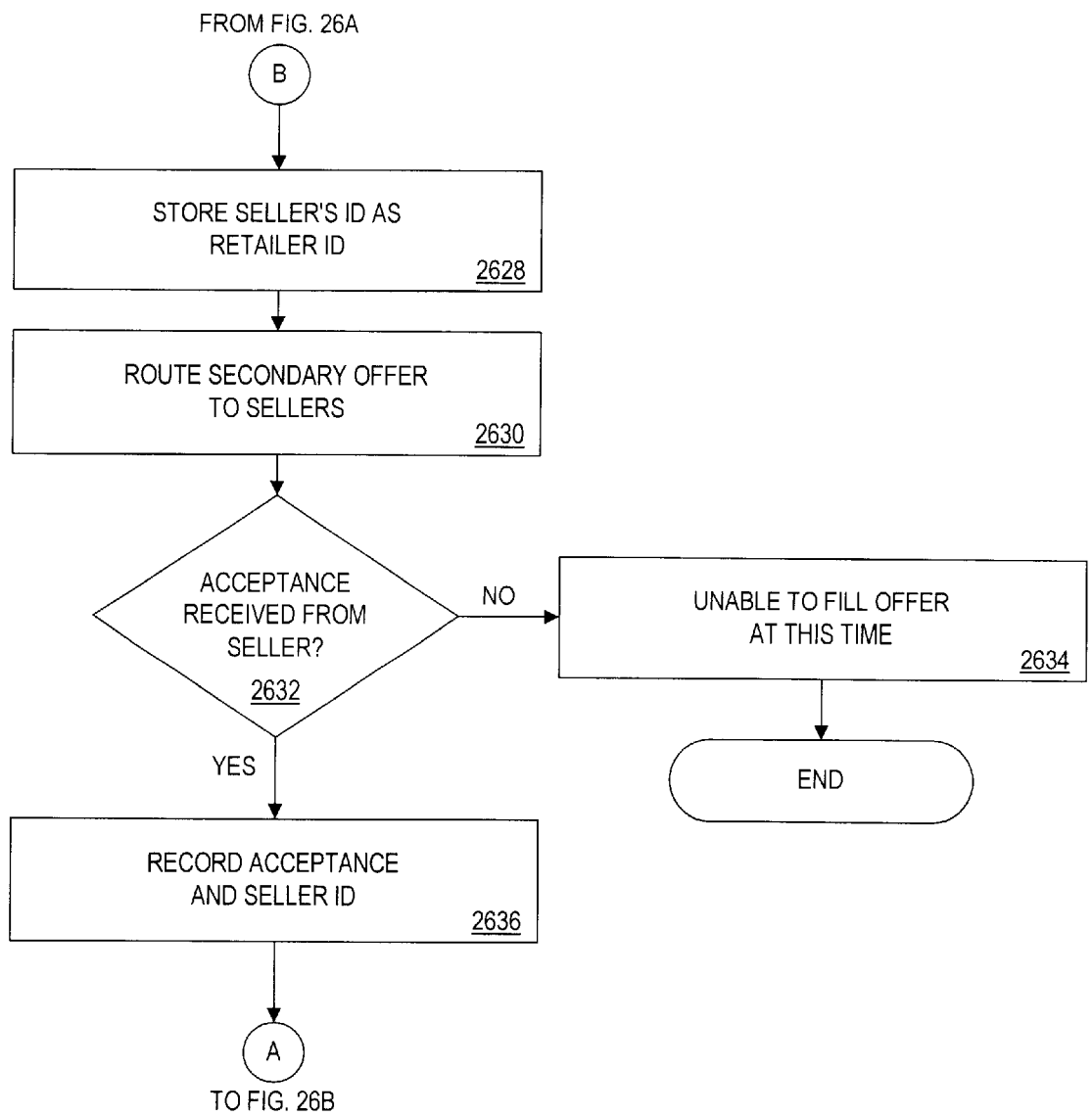

FIGS. 26A to 26C are flow charts illustrating, from the purchasing system's perspective, a method in which a buyer takes possession of a product at a retailer according to an embodiment of the present invention. At 2602, the purchasing system receives a buyer identifier through a communication network such as the Internet. Primary offer information is received from the buyer at 2604 (e.g., product category, selected features, price buyer is ready to pay). If desired, secondary offer information from buyer may also be received at 2604 (i.e. trade-off features and/or prices, and whether buyer is willing to be bound to the secondary offer). A payment identifier and other identifying information (e.g., credit card number, name, telephone number, and e-mail address) is also received from the buyer at 2606. This information may be saved, along with the buyer offer information, at the purchasing system at 2608.

According to the routing embodiment of the present invention, the buyer's primary offer may be routed to one or more sellers, such as one or more manufacturers and retailers, at 2608 and 2610. The sellers may be selected, for example, based on who typically carries items in the product category or the distance between the buyer and each seller. According to another embodiment of the present invention, the purchasing system itself determines if the buyer offer will be accepted.

At 2612 it is determined if an acceptance of the primary offer has been received from a seller. When multiple sellers accept the buyer offer, the purchasing system may, for example: (i) select the first seller to respond; (ii) present the buyer with a choice of sellers; or (iii) select the seller based on predetermined priority rules (e.g., the purchasing system selects the seller that offers the highest commission or the seller that has accepted the most offers within the past month). If no seller accepts the buyer offer, the secondary offer may be submitted as described with respect to FIG. 26C.

Referring now to FIG. 26B, when the buyer offer has been accepted by a seller a freeze may be placed on the buyer's funds for the amount of the product price, plus any applicable tax amount calculated based on buyer's location at 2614. At 2616, acceptance information (e.g., seller identifier) regarding offer is stored by the purchasing system.

If the seller is a retailer at 2618, the purchasing system may simply use the seller's identifier as the retailer identifier at 2620.

If the seller is not a retailer (e.g., is a manufacturer) at 2618, a retailer where the buyer can take possession of the product may be selected at 2622. The retailer may be selected based on, for example: the accepted price; the product; and/or the geographical location (e.g., home address) of the buyer. For example, if the product is a television, a participating retailer that has an established contract with the manufacturer of the television purchased by the buyer may be selected. The selection of the retailer may additionally be based on the offered price for the product. A manufacturer may have a different subsidy price with different retailers for the same make/model television. Since, in one embodiment, the manufacturer (via the purchasing system device 310) pays the retailer the settlement price, the manufacturer would prefer that the buyer takes possession of the product at a retailer with a low settlement price. For example, a manufacturer has a contract price with retailer A of $200 for the Manufacturer X television and a contract price of $190 with retailer B for the Manufacturer X television. A buyer offers $175 for the Manufacturer X television. The manufacturer accepts. The manufacturer would naturally prefer that the buyer take possession of the television at retailer B, because the manufacturer would only need to pay retailer B $15 ($190–$175 =$15) instead of the $25 it would need to pay retailer A ($200–$175=$25). Note that a retailer may also be selected based on the settlement prices the purchasing system has established for the product with various participating retailers that carry the product. For example, the purchasing system may select the one or two retailers whose settlement prices are the lowest.

The purchasing system may also, at 2624, determine and store one or more supplementary offers to present to the buyer. As discussed above, the selection of a supplemental offer (or offers) to include in the redemption information may be based on, by way of example only, the product manufacturer, the product, the buyer and the price of the product.

Finally, redemption information is output to the buyer at 2626, along with any supplemental offer information, in the form of a printable voucher with a unique identifier, which may be in the form of a bar code. If desired, the offer price may be left off the printed voucher so that the retailer will not be aware of the price paid by the buyer.

Referring now to FIG. 26C, when no seller accepts the primary buyer offer, the secondary offer may be retrieved at 2628 and routed to sellers at 2630 (such as the same group of sellers that received the primary offer). If the secondary offer is accepted at 2632, the relevant information is recorded at 2636 and the process continues as it would for a primary offer. If no seller accepts the secondary offer at 2632, the purchasing system is unable to fill the offer at 2634 and the process ends.

Using the Purchasing System to Purchase a Product

To help describe to operation of a purchasing system device 310 according to an embodiment of the present invention, one example of how the purchasing system device 310 may be used will now be provided. Consider a buyer who visits a purchasing system Web site and selects, or types in, "television" as the desired product category. The buyer is then taken through a series of questions that refine the buyer's offer.

In particular, the buyer is presented with a selection of classes of televisions. Each class may include a brief description and an exemplary set of the manufacturers and models within the class. In other words, each class is a subset of the television category and may be an indication of a separate pricing/quality/manufacturer tier. The buyer selects the class that most closely matches the buyer's budget and expectations. When selecting a product class, the buyer is, in effect, agreeing to accept any television within that class for the "established" price—assuming the television has appropriate product features as will now be described. The established price (i.e., the buyer price) may be set by the system and accepted by the buyer or named by the buyer and accepted by the system.

The buyer is also presented with a selection of possible features. For example, television related features may include: (i) a remote control; (ii) surround sound; (iii) cable ready; (iv) picture-in-picture; and (v) screen size. The buyer selects the features the television must include, and, according to some embodiments of the present invention, optional features (or even features must not be included).

The buyer then enters the price he or she is ready to pay or agrees to a price presented by the purchasing system. The buyer may then enter payment information (thereby guaranteeing to purchase a television that matches his criteria) and other identifying information (e.g., name, telephone number, e-mail address). The buyer may then be taken through a series of questions and/or conditions. In other words, the buyer can have some input in establishing one or more of the following conditions:

- the "offer expiration date," or how long the purchasing system device 310 has to find the television;
- the retailers at which the buyer would take possession of the product (such as a geographical range from the buyer's home, or specific retailers that may or may not be included);
- a penalty imposed if the buyer does not take possession of the product, such as a flat fee or percentage of the offered price if the buyer does not take possession of the product within a predefined time period (the buyer may also agree to have the product shipped at the buyer's expense);
- whether the buyer would rather take possession of the product at a retailer or simply have the product shipped (in which case a shipping fee may either be included in, or added to, the offer price); and
- acceptable price/feature trade-offs (secondary offers).

The purchasing system device 310 can then use these conditions to create a buyer offer—or to send a "counter" offer to the buyer when a television with the buyer's preferred features cannot be found. The purchasing system device 310 could also generate an appropriate counter-offer by querying the database of available inventory based on the product information specified in the buyer's offer. A counter-offer may also generated based on information received from a potential seller.

By way of example, consider a buyer that offers $300 for a "class 1" camera having a zoom lens and a tripod. If the purchasing system device 310 does not find a match for such a product it may query the database for a "class 1" camera with just a zoom lens for $250. If a substitute product is found, the purchasing system device 310 presents the option of purchasing it to the buyer. The counter-offer may be presented to the buyer in real time or at a later date (e.g., when inventory becomes available later). The counter-offer message may be sent using, for example, regular mail, e-mail, the Web, a facsimile machine, a telephone, a PDA or a beeper.

The trade-off questionnaire process may also be a valuable demand collection tool, as well as a good way to determine the perceived value of a feature. If desired, the buyer can decide whether or not to be bound by substitute products that the purchasing system device 310 finds based on the trade-off answers.

The final primary and secondary offer specifications are then confirmed by the buyer and are submitted to the purchasing system device 310 for processing. According to one embodiment of the present invention, the offer is routed to manufacturers and/or retailers that carry the product. According to another embodiment of the present invention, the purchasing system device 310 itself determines whether the buyer offer will be accepted.

Assume that a manufacturer accepts the buyer offer and transmits a message to the purchasing system device 310. The purchasing system device 310 records the transaction in a database, charges the buyer's credit card for the amount of the offer price, and issues the buyer a bar coded voucher to be redeemed for the television at a retailer. The voucher may only be valid, for example, at retailers having an agreement with the manufacturer to accept vouchers for that product.

A list of retailers may be printed on a single voucher along with contact information (such as an address and a phone number to let the buyer double-check that the product is in stock). The buyer may be instead be issued a number of separate vouchers, each voucher being redeemable at a different retailer. Supplemental or additional offers at a retailer or merchant can also be included in the voucher.

If the buyer cannot find the television at any participating retailer, the purchasing system device 310 may provide the buyer assistance with: (i) locating the product; (ii) voiding the transaction; (iii) finding a substitute product; or (iv) having the product shipped, perhaps at the purchasing system's cost.

The buyer brings the voucher to a participating retailer and brings the product to the POS terminal or register. According to one embodiment of the present invention, the POS register has an Internet, or other network (e.g., a credit card network), connection to the purchasing system device 310. The cashier scans or inputs into the network a redemption code, such as a bar code included on the voucher along, in some embodiments, with the product bar code. The POS opens a link to the purchasing system device 310 to verify the redemption code and to authorize the transaction. The link may be automatically opened by the system's recognition of the redemption code, or the cashier may actuate a "purchasing system" button to open the connection. A signal is sent to the purchasing system device 310 including the redemption code and, perhaps, the product identifier and a retailer identifier.

Additionally, an offer identifier may be contained in the redemption code—or otherwise included on the voucher—and may be transmitted to the purchasing system 310 for verification. The offer identifier may be an identifier that uniquely identifies the particular buyer offer that was accepted (i.e. the particular buyer, seller and product). In this way, for example, if a buyer loses a voucher the purchasing system device 310 can void the lost redemption code and assign a new redemption code. The purchasing system device 310 may use the same offer identifier with the new redemption code to help track the transaction.

Alternatively, the POS register may send the information to another retailer processor that links to the purchasing system device 310. According to another embodiment, the POS register may retrieve the information at a retailer database into which the purchasing system device 310 periodically loads data. For additional security, the buyer's name or other identifier may be printed directly on the voucher and the cashier may be prompted to ask to check the buyer's identification before accepting the voucher.

The purchasing system device 310 retrieves the record associated with the received redemption code received from the accepted offer database 1400 and determines whether the redemption code received is valid and redeemable at the retailer form which it was received. In some embodiments, the purchasing system device 310 may also verify that the redemption code is redeemable with respect to a received product identifier. If so, the purchasing system device 310 sends a verification to the POS register and stores the redemption information, such as a transaction identifier generated by the retailer. This information may be important for verifying transaction disputes at a later time, for unwinding transactions of goods that are returned by a buyer, or for tracking redemption patterns of buyers (e.g., as where most buyers take possession of products, or how long it typically takes before a buyer takes possession of a product).

The POS register receives the verification signal from the purchasing system device 310 and processes the transaction. The buyer is issued a receipt which that contains, for example: (i) the store price; (ii) the product identifier; (iii) the voucher code; and (iv) an "amount due $0.00." If the amount authorized by the retailer is less than the amount charged to the buyer, the purchasing system device 310 may also credit the buyer's account at this time.

Alternate Embodiments

FIGS. 1 to 26 describe only some of possible embodiments according to the present invention. Several other embodiments will now be briefly described to illustrate various applications of the present invention. These examples are presented only to demonstrate the wide applicability of the present invention. The examples do not constitute a definition of all possible embodiments or all possible applications. Those skilled in the art will understand that there are many more applications of the present invention consistent with the present disclosure. Further, although the following examples are briefly described for clarity, those skilled in the art will understand how to make any changes, if necessary, to the above-described apparatus and methods to accommodate these and other embodiments and applications.

According to one embodiment of the present invention, a buyer may be required to pay part of, or all of, a commission fee to the purchasing system. For example, a buyer may pay $1 for each submitted offer. In another example, the buyer may pay a fixed fee or a fixed percentage of the offer price (or whichever is greater) to the purchasing system device 310 when a buyer offer is accepted.

According to another embodiment of the present invention, when a buyer offer is accepted, a retailer scans the product bar code—or enters an ID number—into a "reservation" system and puts the product behind the counter at the service desk until the buyer arrives. For example, the retailer may have implemented a Telxon Wireless Retail Management System, which includes a wireless remote scanning inventory device. Thus, store personnel, upon receiving an offer for a product, may accept the offer and take the product off the shelf. The product bar code may be using, for example, a PTC 960SL Wireless Mobile Information Manager, deducting the product from inventory and reserving it in association with the buyer identifier. The buyer may present his identifier upon arrival at the retailer (e.g., the buyer's voucher identifier serves as the buyer and reservation identifier) and be given the product.

According to still another embodiment of the present invention, the final amount charged to the buyer's financial account may be different from the amount of the hold put on the buyer's funds at the time of the seller's acceptance. Note that the charge for the product may not be charged to the buyer's credit card until the buyer takes possession of the product at a local retailer. Such an embodiment may be useful where the final price for the product (e.g., POS terminal price at the time of redemption) is different than the price established online. For example, the buyer may be attempting to redeem the product in a different tax area than the one used to calculate the final price. In another example, the particular retailer the buyer is attempting to redeem the voucher at my be having a sale on the particular product, and the sale price may be lower than the price established online with the manufacturer. If the buyer is guaranteed the lower of these two prices, the buyer's final price will be lower than the price established online. In yet another example, the buyer may have a predetermined window of time within which to redeem his voucher for the product at the price established online. The price may increase (e.g., a penalty may be imposed) if the buyer waits to redeem the product.

According to yet another embodiment of the present invention, instead of being charged the price of the product online at the point of a seller's acceptance of a buyer's offer, the buyer may be allowed to pay the established price directly to the retailer when he or she arrives at the retailer to take possession of the product. In such an embodiment, the buyer would "reserve" an established price online (rather than purchase the product online and take possession at a local retailer). The purchasing system device 310 would store the buyer's primary offer information in a similar manner to that described with respect to other embodiments—but would not require the buyer to guarantee payment when submitting the buyer offer. Once the buyer offer is accepted by a seller, the acceptance would be stored at the purchasing system device 310. A voucher may be printed for the buyer in the above described manner, with the addition of the offer price. When the buyer attempts to redeem the voucher at a local retailer, the retailer: (i) retrieves the reserved price from the purchasing system device 310 or from a local database; or (ii) reads the needed information from the voucher. The retailer collects the online price from the buyer at the POS and communicates the redemption to the purchasing system device 310, either in real time or in a batch process at a later time. The retailer and the purchasing system device 310 then settle the transfer of payment as necessary.

In another embodiment of the present invention, the retailer does not open a back-channel with the purchasing system device 310 during the transaction. Instead, the information regarding the redemption of the voucher (e.g., the product identifier, the retailers at which it is redeemable, the accepted price) is encoded onto the voucher itself. Such encoding may be in the form of, for example, a one or two-dimensional bar code.

According to another embodiment of the present invention, only retailers with current inventory (based on real time inventory checks) or who potentially have the product in stock (based on purchase orders from the manufacturer, or daily inventory notification downloads) will receive a buyer offer.

Another embodiment of the present invention lets the buyer select a time window and geographic region within which the buyer will take possession of the product. The purchasing system determines which stores will have the product during the specified time period based on, for example, statistical likelihood. If the buyer does not take possession of the product within the time window, the purchasing system device 310 may, for example: (i) invalidate the voucher charge the buyer a penalty; or (ii) increase the price of the product. The price may be increased, for example, by predefined increments for each day the buyer fails to take possession of the product.

According to still another embodiment of the present invention, an extra fee may be charged for "guaranteed" availability at local store. When submitting an offer, the buyer checks off a "guaranteed availability at a particular retailer" button. Upon receiving an acceptance of the buyer's offer, the purchasing system device 310 determines which, if any, retailer currently has the product in stock and communicates with the retailer to have the product put aside for the buyer (this may be done, for example, via e-mail or facsimile). The extra fee that the buyer pays for this guaranteed availability may be disbursed (the entire or partial amount) to the retailer which puts the product aside.

It is also possible, according to another embodiment of the present invention, for the seller to ship the product to the buyer if the buyer cannot find the product in a local retailer within a predefined time period. In this case, the seller may "guarantee" the product to the buyer. If the buyer cannot find the product, a purchasing system service representatives may help track the product down. If the product cannot be found, the purchasing system device 310 notifies the manufacturer, who ships the product to the buyer at no extra charge.

According to another embodiment of the present invention, the voucher contains commands that change the retail price to the price named by the buyer. The command may be, for example, determine an appropriate amount to subtract from the retail price such that the product costs $X. The voucher may also contain a command that prompts the POS to instruct the buyer to swipe the credit card used to bind the buyer offer. The POS then verifies that the credit card has the same number that is embedded in the voucher's bar code. If so, the price is applied to the product and the scanned credit card can be used to make the purchase. This lets the buyer's credit card act as a private key.

According to another embodiment of the present invention, the purchasing system device 310 tracks the redemption rate of vouchers at retailers. When a week has passed and the buyer has not taken possession of the product, the purchasing system generates an e-mail that lets the buyer either cancel the contract or have the product shipped. Also, if a buyer has used the voucher a "thank you" message can be sent to the buyer (e.g., via e-mail) along with other types of offers (e.g., for additional products the buyer may be interested in purchasing).

In a similar way, a buyer may enter a credit or frequent shopper card when making a purchase at the POS and the purchasing system device 310 may determine if a reservation exists for another product the store typically stocks. If the buyer does have a reservation, the POS can prompt the cashier to remind the buyer about the reservation.

Another embodiment of the present invention is directed to manufacturers that sell slightly altered products through different retailers, such as products with different model numbers and/or slightly different features. In this case, the voucher issued to the buyer may be valid for different types of products depending on the retailer. The identifier (e.g., make/model number) of each product may be printed directly on the voucher next to the corresponding retailer name, leaving it up to the buyer or store personnel to ensure that the correct product is redeemed.

Similarly, the voucher may contain several bar codes, one for each retailer, that contain the encoded product identifier corresponding to each retailer. According to another embodiment, a separate voucher may be issued for each retailer and, once it is determined by the purchasing system device 310 that the buyer has redeemed one voucher, the other associated vouchers can be voided. For example, each voucher can have the same voucher identifier or redemption code, and when the purchasing system receives a signal at a retailer indicating that a redemption code has been redeemed, it invalidates any corresponding vouchers with the same redemption code.

According to still another embodiment of the present invention, a redemption code may be redeemable for products from different sellers. For example, several sellers may have agreed to accept a buyer's offer. Instead of selecting one seller to fulfill the buyer's offer, the purchasing system device 310 may give the buyer the option of selecting any of the accepting sellers. This option may be presented to the buyer directly at the Web site, before a redemption code is issued (in which case the redemption code would be issued for whichever seller's product the buyer elects), or the redemption code may be issued for different sellers (and/or different products) and the buyer indicates his selection at the point of redemption (i.e. by selecting which retailer and/or which product).

According to another embodiment of the present invention, the purchasing system presents the buyer with a number of retailers that have the product available, and the associated price at each retailer, letting the buyer select one of the prices. For example, a buyer may be willing to pay a little more for a product if he or she can take possession of the product at a retailer located near his or her home. In another embodiment of the present invention, the purchasing system device 310 selects retailers based on distance from the buyer's home address.

According to another embodiment of the present invention, prices available to a buyer through the purchasing system device 310 vary based on the buyer (e.g., the buyer's transactional history with the purchasing system device 310) or the buyer's location (e.g., based on a telephone number area code or the buyer's home address ZIP code). For example, the settlement price may be based on the number of transactions previously completed by the buyer with the purchasing system (e.g., if the buyer previously completed no transactions the minimum selling price is $200, if the buyer previously completed 1 transaction the minimum price is $195, and so on). A "complete" transaction may comprise, for example: (i) submitting an offer to the purchasing system device 310; (ii) having an offer accepted by the purchasing system device 310; or (iii) redeeming a voucher at a retailer.

If a seller specifies a certain quantity of a product available in a location to be sold through the purchasing system device 310, a certain number of redemption codes may be issued based on a statistical likelihood of redemption. That is, the number of redemption codes issued may be greater than the allocated available supply, and the redemption codes may be authorized for redemption at the retailer POS until the designated supply is depleted. If a buyer attempts to redeem a voucher after the supply has been depleted, the purchasing system device 310 may transmit a counter-offer to the buyer at the POS.

According to another embodiment of the present invention, instead of specifying a settlement price, a seller can specify a maximum subsidy amount that that will be provided to the purchasing system device 310 for each product sold. Thus, when determining whether to accept a buyer's offer for a given product, the purchasing system device 310 may determine: (i) the subsidy amount provided by the manufacturer for the product; and (ii) the settlement price due to a retailer for the product. If, for example, the offer plus the subsidy amount is at least equal to the settlement price, the purchasing system device 310 may accept the buyer offer. The purchasing system device 310 may also, in some cases, determine that a monetary loss up to a predetermined amount is acceptable in order to increase the volume of sales. In this case, the purchasing system device 310 would accept an buyer's offer if the buyer's price plus the manufacturer's subsidy amount was not below the predetermined acceptable loss amount (in effect, the purchasing system device 310 is further subsidizing the buyer's purchase).

According to another embodiment of the present invention, the redemption information sent from the purchasing system to the buyer is similar to a product manufacturer coupon. That is, a voucher can be recognized by a retailer to be worth, for example, the difference between the retail price for the product and the buyer price. By way of example, a buyer may arrange with the purchasing system to purchase a television for $190. The buyer brings a voucher to a retailer that normally sells the product for $200 (i.e., the retail price). In this case, the retailer may recognize that the voucher is redeemable for $10 towards the purchase of the product. If the buyer brought the voucher to another retailer at which it was redeemable, where the product was normally sold for $210, that retailer would recognize that the voucher is redeemable for $20. In other words, in such an embodiment, the actual value that the voucher is redeemable for depends on the retail price of the retailer at which the buyer takes possession of the product. The retailer may then be subsequently reimbursed the difference between the retail price and the buyer price by the purchasing system.

According to another embodiment of the present invention, instead of the purchasing system transmitting redemption information to the buyer, the redemption information is instead sent from the buyer to the purchasing system. For example, the buyer may supply his or her name, address, social security number, telephone number and/or a password to the purchasing system. In this case, the buyer can provide the redemption information to the retailer to take possession of the product.

According to another embodiment of the present invention, the purchasing system may establish a price between a buyer and seller for a product that fulfills at least one product requirement without specifying a particular product that will be provided to the buyer. For example, the purchasing system may establish that the buyer will pay $200 for a 21 inch screen television with a remote control. The product requirement may also, for example, describe a suggested retail price or average retail price associated with the product that will be provided to the buyer without specifying the particular product. Note that the price established between the buyer and the seller (e.g., the $200 ) may be proposed by the purchasing system, the seller or the buyer. A particular product (e.g., a particular model television available from a particular manufacturer) is then selected and provided to the buyer at the retailer. Note that either the purchasing system, the seller or the retailer may select the particular product. If the retailer is to select the particular product, a voucher identifying the product requirements may be transmitted to the buyer. If the purchasing system or seller is to select the particular product, the voucher may, if desired, identify the particular product that has been selected.

Such an embodiment may be used, for example, by a retailer to sell products through the purchasing system. The retailer may provide a product to a buyers for a price below the product's retail price in exchange for the right to select the particular product (e.g., manufacturer and model number) that will be provided to the buyer (although the buyer still, of course, determines at least some of the general product requirements). For example, a buyer may indicate that he or she wants a 21" to 25" color television from any manufacturer. The buyer may further indicate a willingness to wait up to six months to get such a television. A retailer may be willing to establish a price representing 50% of the retail price for such a television, because the retailer now has this demand for a television that may be collected, if desired (e.g., by pooling the demand of a number of buyers). Moreover, the demand can be fulfilled anytime within the next six months, and the retailer can use distressed inventory to fulfill the demand.

The present invention has been described in terms of several embodiments solely for the purpose of illustration.

Persons skilled in the art will recognize from this description that the invention is not limited to the embodiments described, but may be practiced with modifications and alterations limited only by the spirit and scope of the appended claims.

What is claimed is:

1. A method of operating a purchasing system, comprising:
   communicating with a buyer through a communication network to establish, between the buyer and a purchasing system, a first price for a product;
   arranging for the buyer to take possession of the product at a retailer, the retailer being a different entity from the purchasing system,
      wherein the retailer that is a different entity from the purchasing system that offer, to buyers who do not establish the first price through the communication network, the product for sale at a second price that is different than the first price; and
   transmitting to the retailer verification information which enables the retailer to authorize the buyer to take possession of the product,
      wherein the buyer provides a payment, based on the first price, to the purchasing system in exchange for the right to take possession of the product at the retailer.

2. The method of claim 1, wherein the first price is based on the second price.

3. The method of claim 1, wherein the first price is not solely a function of the second price.

4. The method of claim 1, wherein said transmitting verification information comprises:
   transmitting a one way hash function such that the retailer can determine, using the one way hash function, if redemption information possessed by a buyer authorizes the buyer to take possession of the product.

5. The method of claim 1, wherein said transmitting verification information comprises:
   receiving from the retailer information about an attempt to take possession of the product; and
   transmitting to the retailer verification information authorizing the buyer to take possession of the product.

6. The method of claim 1, wherein said transmitting verification information comprises:
   transmitting to the retailer verification information authorizing a plurality of buyers to take possession of a plurality of products.

7. The method of claim 1, further comprising:
   arranging for the retailer to receive payment from a party other than the buyer in exchange for providing the product to the buyer.

8. The method of claim 7, wherein the payment received by the retailer is based on second price.

9. The method of claim 7, wherein the payment received by the retailer is received from at least one of: (i) the purchasing system; and (ii) a manufacturer of the product.

10. The method of claim 1, wherein the buyer provides the payment to the purchasing system when taking possession of the product at the retailer.

11. The method of claim 1, wherein the location of the retailer is remote from the purchasing system and geographically related to a location associated with the buyer.

12. The method of claim 1, further comprising:
   transmitting redemption information to the buyer,
   wherein the redemption information includes a redemption code used by the buyer to obtain the product from the retailer.

13. The method of claim 12, wherein the redemption information further comprises information that enables the creation of a voucher.

14. The method of claim 1, further comprising:
   disbursing payment amongst the buyer, the purchasing system and the retailer such that: (i) the buyer provides payment of an amount based on the first price and receives the product; (ii) the retailer provides the product and receives payment of an amount based on the second price; and (iii) the purchasing system receives payment of an amount based on the first price and provides payment of an amount based on the second price.

15. A medium storing instructions adapted to be executed by a processor to perform a method for operating a purchasing system, said method comprising:
   communicating with a buyer through a communication network to establish, between the buyer and a purchasing system, a first price for a product;
   arranging for the buyer to take possession of the product at a retailer, the retailer being a different entity from the purchasing system,
      wherein the retailer that is a different entity from the purchasing system that offers, to buyers who do not establish the first price through the communication network, the product for sale at a second price that is different than the first price; and
   transmitting to the retailer verification information which enables the retailer to authorize the buyer to take possession of the product,
   wherein the buyer provides a payment, based on the first price, to the purchasing system in exchange for the right to take possession of the product at the retailer.

16. A purchasing system device, comprising:
   a processor; and
   a storage device coupled to said processor and storing instructions adapted to be executed by said processor to:
      communicating with a buyer through a communication network to establish, between the buyer and a purchasing system, a first price for a product,
   arranging for the buyer to take possession of the product at a retailer, the retailer being a different entity from the purchasing systems,
      wherein the retailer that is a different entity from the purchasing system offers, to buyers who do not establish the first price through the communication network, the product for sale at a second price that is different than the first price, and
      transmitting to the retailer verification information which enables the retailer to authorize the buyer to take possession of the product,
      wherein the buyer provides a payment, based on the first price, to the purchasing system in exchange for the right to take possession of the product at the retailer.

17. A method of operating a purchasing system, comprising:
   establishing an agreement between a retailer and a purchasing system,
      wherein, under terms of the agreement, the retailer agrees to provide, in exchange for a payment of a first price from the purchasing system, a product to customers who establish a second price for the product through a communication network, and
      wherein the retailer offers the product for sale at a third price to customers who do not establish the second price through the communication network;

establishing, between a customer and the purchasing system, the second price through the communication network, wherein the second price is not dependent on the first price;

collecting a payment of the second price from the customer; and providing the payment of the first price to the retailer once the retailer provides the product to the customer.

18. The method of claim 17, wherein the first price is based on the third price.

19. The method of claim 17, wherein the third price is a price displayed to customers visiting an establishment the retailer.

20. The method of claim 17, wherein the step of establishing the second price comprises:

receiving an offer for the product from the customer, the offer defining the second price;

evaluating a difference between the first price and the second price; and determining whether to accept the offer based at least on the difference.

21. The method of claim 20, further comprising:

outputting a counter-offer to the customer, the counter-offer defining an adjusted first price, if the difference is unacceptable.

22. A medium storing instructions adapted to be executed by a processor to perform a method for operating a purchasing system, said method comprising:

establishing an agreement between a retailer and a purchasing system, wherein, under terms of the agreement, the retailer agrees to provide, in exchange for a payment of a first price from the purchasing system, a product to customers who establish a second price for the product through a communication network, and wherein the retailer offers the product for sale at a third price to customers who do not establish the second price through the communication network;

establishing, between a customer and the purchasing system, the second price with the customer through the communication network, wherein the second price is not dependent on the first price;

collecting a payment of the second price from the customer; and providing the payment of the first price to the retailer once the retailer provides the product to the customer.

23. An apparatus comprising:

a processor, and a storage device coupled to said processor and storing instructions adapted to be executed by said processor to:

establish an agreement between a retailer and a purchasing system, wherein, under terms of the agreement, the retailer agrees to provide, in exchange for a payment of a first price from the purchasing system, a product to customers who establish a second price for the product through a communication network, and wherein the retailer offers the product for sale at a third price to customers who do not establish the second price through the communication network;

establish, between a customer and the purchasing system, the second price with the customer through the communication network, wherein the second price is not dependent on the first price;

collect a payment of the second price from the customer; and provide the payment of the first price to the retailer once the retailer provides the product to the customer.

* * * * *

UNITED STATES PATENT AND TRADEMARK OFFICE
CERTIFICATE OF CORRECTION

PATENT NO.    : 6,754,636 B1
DATED         : June 22, 2004
INVENTOR(S)   : Walker, Jay S. et al.

It is certified that error appears in the above-identified patent and that said Letters Patent is hereby corrected as shown below:

Column 39,
Line 15, please cancel "purchasing system that offer, to buyers who do not" and insert the following: -- purchasing system offers, to buyers who do not -- so that Claim 1 reads:

1. A method of operating a purchasing system, comprising:
   communicating with a buyer through a communication network to establish, between the buyer and a purchasing system, a first price for a product;
   arranging for the buyer to take possession of the product at a retailer, the retailer being a different entity from the purchasing system,
      wherein the retailer that is a different entity from the purchasing system offers, to buyers who do not establish the first price through the communication network, the product for sale at a second price that is different than the first price; and
   transmitting to the retailer verification information which enables the retailer to authorize the buyer to take possession of the product,
      wherein the buyer provides a payment, based on the first price, to the purchasing system in exchange for the right to take possession of the product at the retailer.

Applicants believe no fee is due. Please charge any fees that may be required for this Request, or credit any overpayment to Deposit Account No. 50-0271. Order number 99-013. The Commissioner is further authorized to charge any additional fees which may be required for the submission of this paper, or credit any overpayment to Deposit Account No. 50-0271.

Furthermore, should an extension of time be required, please grant any extension of time which may be required to make this submission timely, and charge any fee for such an extension to Deposit Account No. 50-0271.

Signed and Sealed this

Fourteenth Day of September, 2004

JON W. DUDAS
*Director of the United States Patent and Trademark Office*